United States Patent
Okuda et al.

(10) Patent No.: US 7,310,475 B2
(45) Date of Patent: Dec. 18, 2007

(54) MOTOR DRIVING APPARATUS

(75) Inventors: Tatsuya Okuda, Tokyo (JP); Takahiro Urakabe, Tokyo (JP); Yuuji Kuramoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 87 days.

(21) Appl. No.: 11/094,232

(22) Filed: Mar. 31, 2005

(65) Prior Publication Data

US 2006/0067655 A1 Mar. 30, 2006

(30) Foreign Application Priority Data

Sep. 30, 2004 (JP) ............................. 2004-287827

(51) Int. Cl.
*H02P 7/06* (2006.01)
*H03D 13/00* (2006.01)

(52) U.S. Cl. ...................... 388/805; 318/138; 318/700; 318/799; 318/800; 318/811; 388/800; 388/900

(58) Field of Classification Search ................ 318/139, 318/700–811; 388/800–900
See application file for complete search history.

(56) References Cited

U.S. PATENT DOCUMENTS

| | | | | | |
|---|---|---|---|---|---|
| 5,420,777 | A | * | 5/1995 | Muto | 363/21.17 |
| 5,576,606 | A | * | 11/1996 | Nguyen Phuoc et al. | 318/801 |
| 5,780,980 | A | * | 7/1998 | Naito | 318/139 |
| 6,456,508 | B1 | * | 9/2002 | Namai et al. | 363/17 |
| 7,045,980 | B2 | * | 5/2006 | Nakayama | 318/139 |
| 7,075,268 | B2 | * | 7/2006 | Wills et al. | 318/812 |
| 7,102,903 | B2 | * | 9/2006 | Nakamura et al. | 363/98 |

FOREIGN PATENT DOCUMENTS

| | | |
|---|---|---|
| JP | 8-214592 | 8/1996 |
| JP | 2004-187468 | 7/2004 |

* cited by examiner

*Primary Examiner*—Lincoln Donovan
*Assistant Examiner*—Tyrone Smith
(74) *Attorney, Agent, or Firm*—Oblon, Spivak, McClelland, Maier & Neustadt, P.C.

(57) ABSTRACT

A motor driving apparatus is provided which can minimize ripple current flowing through a DC link capacitor, and downsize the motor driving apparatus. It synchronizes the frequency of the inverter carrier signal for driving an inverter with the frequency of the DC/DC converter carrier signal for driving a DC/DC converter, and carries out control in such a manner that the center of a period during which the input current of the inverter is zero and the center of a period during which the output current of the DC/DC converter is zero are matched.

7 Claims, 29 Drawing Sheets

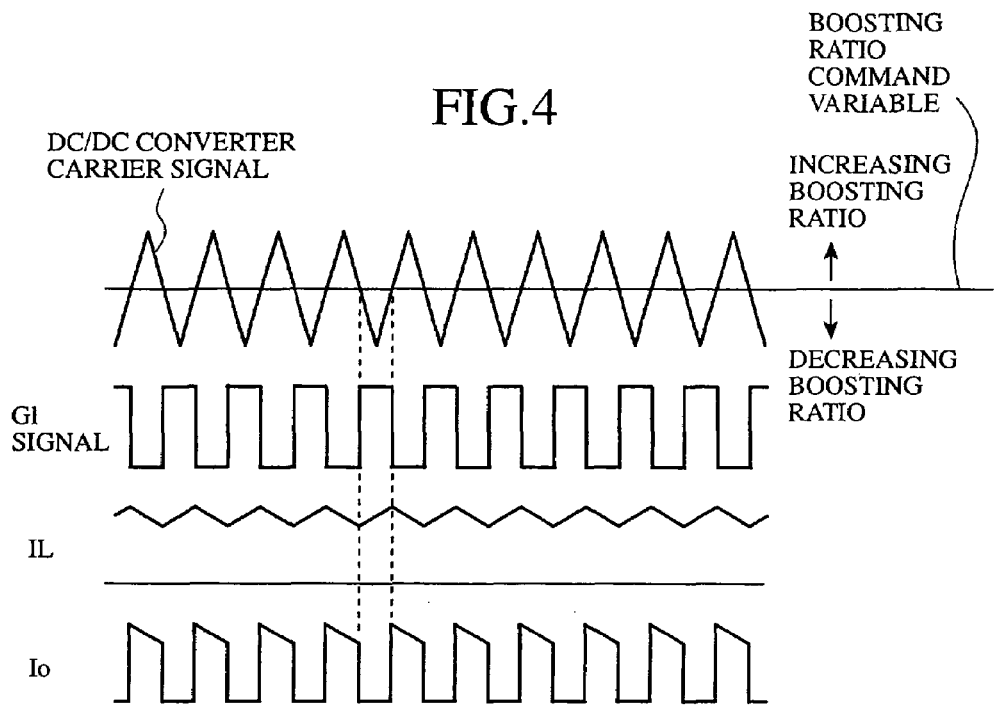
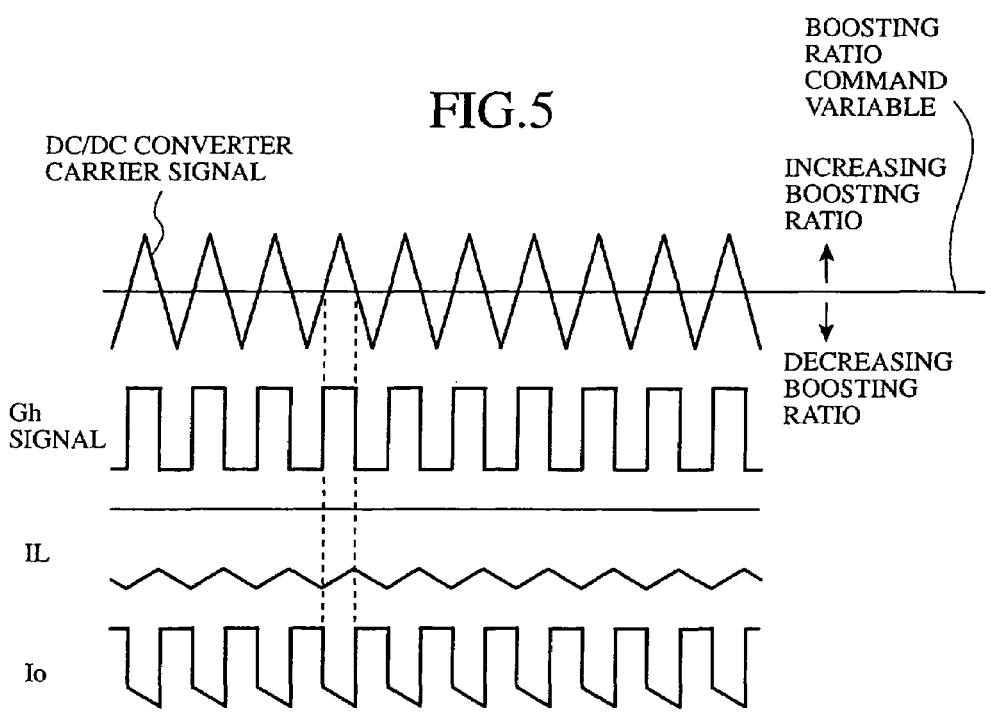

BOOSTING RATIO COMMAND VARIABLE 2.0

MODULATION FACTOR 0.7, POWER FACTOR 0.8

ON-DUTY D = 0.6

ON-DUTY D = 0.33

MOTOR DRIVING APPARATUS

BACKGROUND OF THE INVENTION

1. Field of the Invention

The present invention relates to a control method of a motor driving apparatus using a DC/DC converter and an inverter.

2. Description of Related Art

As an example of a conventional motor driving apparatus used for an electric vehicle or HEV (Hybrid Electric Vehicle), a motor driving apparatus disclosed in Relevant Reference 1 is known. The motor driving apparatus includes a motor, an inverter for converting DC power to AC power, a high voltage battery, a DC/DC converter and a DC link capacitor. The DC/DC converter boosts the voltage fed from a high voltage battery and supplies the DC power to the inverter during power running, and decreases the voltage of the DC power output from the inverter and supplies it to the high voltage battery during regenerative running. The DC link capacitor, which includes a plurality of capacitors, is interposed between the DC/DC converter and the inverter to smooth the DC voltage.

Relevant Reference 1: Japanese patent application laid-open No. 8-214592/1996.

The conventional motor driving apparatus has the following problems. First, a power conversion unit constructed by integrating the inverter, DC/DC converter and DC link capacitor into a module to downsize the unit has a problem of increasing the ripple current flowing through the DC link capacitor because of interaction between the current pulses fed from the DC/DC converter to the DC link capacitor and the current pulses fed from the DC link capacitor to the inverter. Second, a configuration that limits the ripple current per capacitor within a tolerance to maintain the life of the DC link capacitor has a problem of increasing the size of the DC link capacitor, which in turn increases the size of the unit in its entirety.

SUMMARY OF THE INVENTION

The present invention is implemented to solve the foregoing problems. It is therefore an object of the present invention to reduce the size of the motor driving apparatus by minimizing the ripple current flowing through the DC link capacitor.

According to one aspect of the present invention, there is provided a motor driving apparatus including: a power supply; a DC/DC converter; an inverter; a DC link capacitor connected between the inverter and the DC/DC converter for smoothing a voltage; and a control circuit for controlling power supply from the DC/DC converter to the inverter in a manner that a period in which output current of the DC/DC converter becomes zero takes place in a period during which an input current to the inverter is zero.

According to the present invention, a period during which the output current of the DC/DC converter is zero is placed in the period during which the input current to the inverter is zero. As a result, the timing of the current pulses supplied from the DC/DC converter to the DC link capacitor and the timing of the current pulses supplied from the DC link capacitor to the inverter are matched, which makes it possible to reduce the effective values of the current flowing through the DC link capacitor, and to reduce the capacity of the DC link capacitor and the size of the apparatus.

BRIEF DESCRIPTION OF THE DRAWINGS

FIG. 4 is a diagram illustrating the boosting operation of a DC/DC converter;

FIG. 5 is a diagram illustrating the voltage reduction operation of the DC/DC converter;

DETAILED DESCRIPTION OF THE PREFERRED EMBODIMENTS

The invention will now be described with reference to the accompanying drawings.

Embodiment 1

Figure 1:
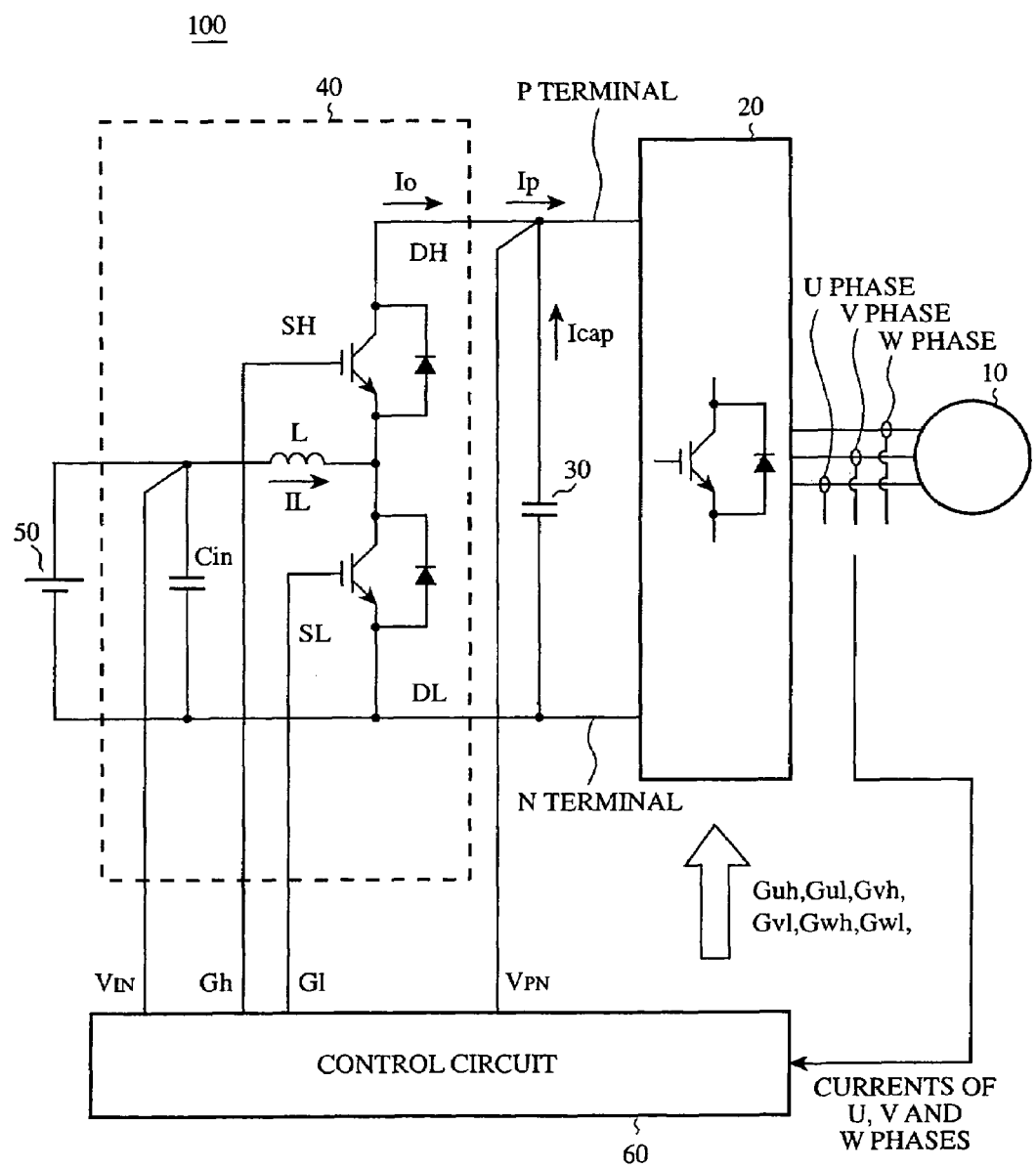
FIG. 1 is a block diagram showing a configuration of a motor driving apparatus of an embodiment 1 in accordance with the present invention.

FIG. 1 is a block diagram showing a configuration of a motor driving apparatus 100 of an embodiment 1 in accordance with the present invention. The motor driving apparatus 100 is used for an electric vehicle or HEV. As shown in FIG. 1, the motor driving apparatus 100 includes a vehicle driving motor 10, a triangular wave comparing type PWM (Pulse Width Modulation) inverter 20, a DC link capacitor 30, a DC/DC converter 40, a high voltage battery (power supply) 50 of 100 V-300 V, and a control circuit 60.

The DC/DC converter 40 includes semiconductor switches (IGBT: Insulated Gate Bipolar Transistors) SH and SL, diodes DH and DL, a choke coil L, and an input voltage smoothing capacitor Cin.

The semiconductor switches SH and SL have their collector terminals connected to the cathode terminals of the diodes DH and DL, and their emitter terminals connected to the anode terminals of the diodes DH and DL.

The switch SH has its collector terminal connected to a first terminal of the DC link capacitor 30 and to the P terminal of the inverter 20, and has its emitter terminal connected to the collector terminal of the switch SL and to a first terminal of the choke coil L.

The choke coil L has its second terminal connected to a first terminal of the input voltage smoothing capacitor Cin, and to the plus terminal of the high voltage battery 50. The high voltage battery 50 has its minus terminal connected to a second terminal of the input voltage smoothing capacitor Cin, to the emitter terminal of the switch SL, to a second terminal of the DC link capacitor 30, and to the N terminal of the inverter 20.

The inverter 20 has its output terminals, the U-phase terminal, V-phase terminal and W-phase terminal, connected to the connection terminals of the vehicle driving motor 10, the U-phase motor terminal, V-phase motor terminal and W-phase motor terminal.

Figure 2:
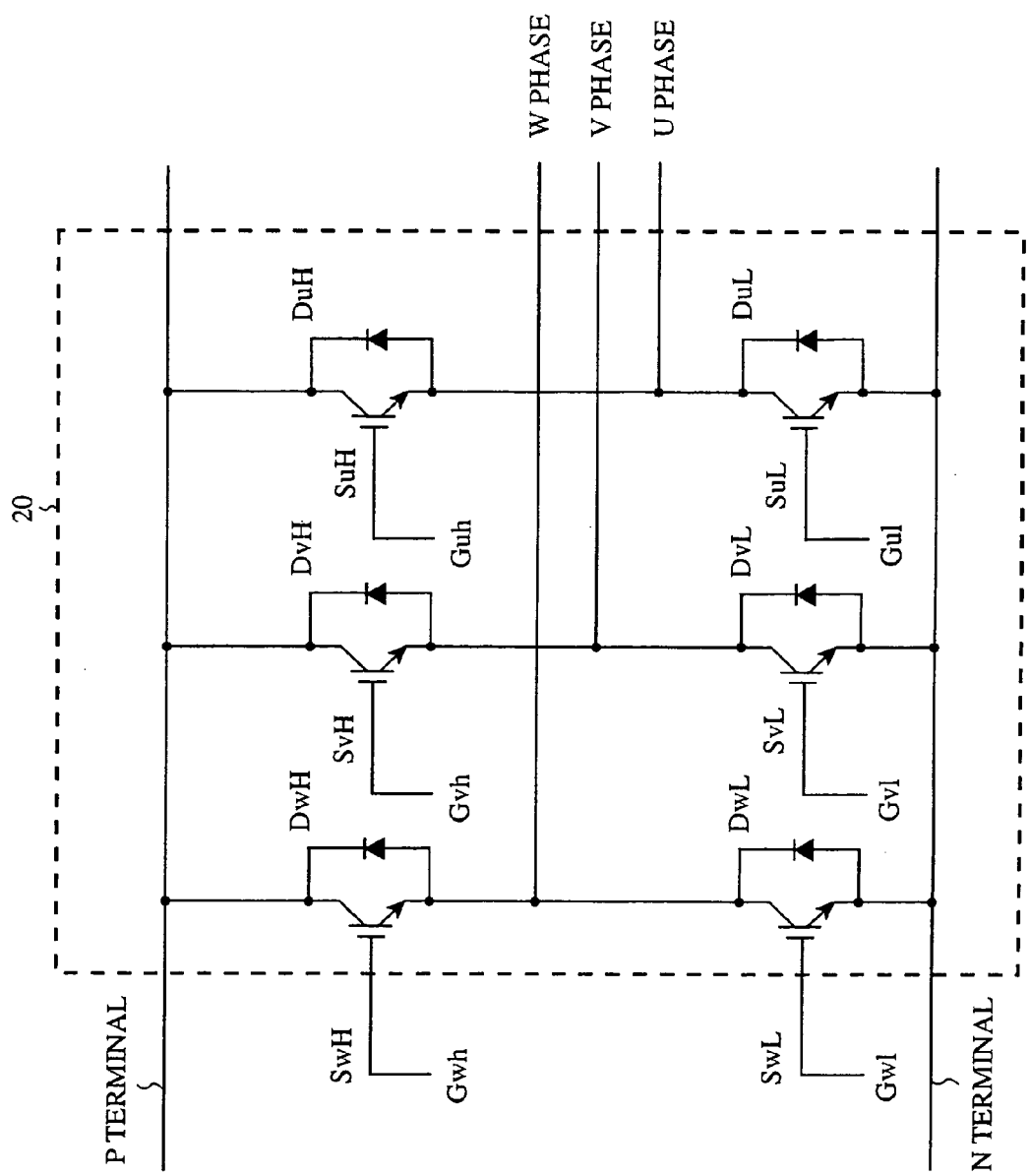
FIG. 2 is a block diagram showing a configuration of an inverter of the embodiment 1 in accordance with the present invention.

FIG. 2 is a block diagram showing a configuration of the inverter 20. As shown in FIG. 2, the inverter 20 includes semiconductor switches (IGBT) SuH, SvH, SwH, SuL, SvL and SwL, and diodes DuH, DvH, DwH, DuL, DvL and DwL.

The semiconductor switches SuH, SvH, SwH, SuL, SvL and SwL have their collector terminals connected to the cathode terminals of the diodes DuH, DvH, DwH, DuL, DvL and DwL, and have their emitter terminals connected to the anode terminals of the diodes DuH, DvH, DwH, DuL, DvL and DwL.

The switch SuH has its collector terminal connected to the P terminal, and its emitter terminal connected to the collector terminal of the switch SuL and to the U-phase terminal, and the switch SuL has its emitter terminal connected to the N terminal, thereby forming the U-phase arm.

Likewise, the switch SvH has its collector terminal connected to the P terminal, and its emitter terminal connected to the collector terminal of the switch SvL and to the V-phase terminal, and the switch SvL has its emitter terminal connected to the N terminal, thereby forming the V-phase arm.

In addition, the switch SwH has its collector terminal connected to the P terminal, and its emitter terminal connected to the collector terminal of the switch SwL and to the W-phase terminal, and the switch SwL has its emitter terminal connected to the N terminal, thereby forming the W-phase arm.

Next, the operation will be described.

The control circuit 60 outputs signals Guh, Gul, Gvh, Gvl, Gwh and Gwl which have been converted to voltage signals matching the input voltage levels, and supplies these signals to the gates of the semiconductor switches SuH, SuL, SvH, SvL, SwH and SwL of the inverter 20.

The control circuit 60 also outputs signals Gh and Gl which have been converted in the same manner, and supplies them to the gates of the switches SH and SL of the DC/DC converter 40.

The signals Guh, Gul, Gvh, Gvl, Gwh and Gwl control the semiconductor switches SuH, SuL, SvH, SvL, SwH and SwL so that the inverter 20 converts the DC voltage fed from the high voltage battery 50 via the DC/DC converter 40 to the AC voltage, and supplies it to the vehicle driving motor 10.

In addition, to operate the vehicle driving motor 10 in a power generating mode, the control circuit 60 controls the inverter 20 in such a manner that the inverter 20 converts the AC voltage from the vehicle driving motor 10 to the DC voltage, and supplies the DC voltage to the high voltage battery 50.

Furthermore, receiving the voltage of the DC link capacitor 30, the voltage of the input voltage smoothing capacitor Cin (=the voltage of the high voltage battery 50), and the current values of the U-phase, V-phase and W-phase of the inverter 20, the control circuit 60 uses them for controlling the inverter 20 and DC/DC converter 40.

Next, the operation of the inverter 20 will be described.

Figure 3:
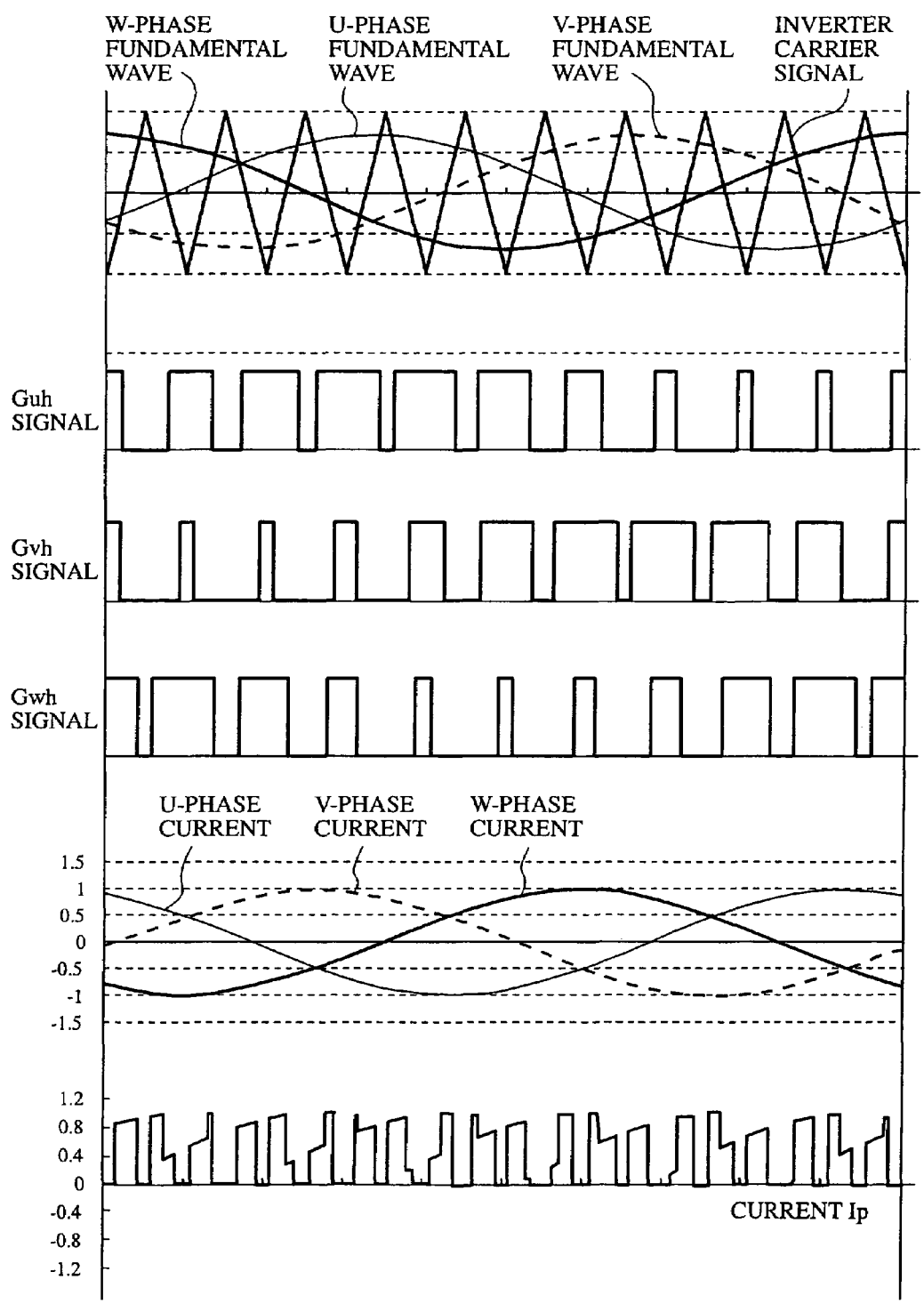
FIG. 3 is a diagram illustrating the operation of a triangular wave comparing type PWM inverter.

FIG. 3 is a diagram illustrating the operation of the inverter 20. FIG. 3 illustrates waveforms of the inverter 20: a carrier signal waveform; fundamental signal waveforms (voltage command variables) of the U-phase, V-phase and W-phase; the signals Guh, Gvh and Gwh generated in response to comparing operation of the carrier signal with the fundamental signals; motor phase currents of the U-phase, V-phase and W-phase; and an input current Ip of the inverter 20.

Here, the signal Gul is an inverted signal of the signal Guh, the signal Gvl is an inverted signal of the signal Gvh, and the signal Gwl is an inverted signal of the signal Gwh.

Receiving the signals Guh, Gvh, Gwh, Gul, Gvl and Gwl at their gates, the semiconductor switches SuH, SvH, SwH, SuL, SvL and SwL generate at the respective phase terminals the AC voltages which have the same amplitude as the fundamental signals of the U-phase, V-phase and W-phase, and depend on the input voltage (voltage across the P-N terminals) of the inverter 20.

Varying the amplitudes of the fundamental signals of the respective phases makes it possible to vary the amplitudes of the voltages of the respective phases. In addition, varying the phases of the respective phase currents and the phases of the fundamental signals makes it possible to vary the phases of the terminal voltages of the respective phases and the phases of the respective phase currents.

Here, the ratio between the zero-to-peak value of the carrier signal of the inverter 20 and the amplitude of the fundamental signals (fundamental wave amplitude/inverter carrier zero-to-peak value) is referred to as a modulation factor. In addition, cosφ is referred to as a power factor, where φ is the phase between the phase current and the fundamental signal.

Next, the operation of the DC/DC converter 40 will be described.

FIG. 4 is a diagram illustrating the boosting operation of the DC/DC converter 40. The boosting operation takes place when the power flows from the high voltage battery 50 to the inverter 20. FIG. 4 illustrates the carrier signal of the DC/DC converter 40; the boosting ratio command variable; the gate signal Gl of the switch SL generated by the comparing operation of the carrier signal with the boosting ratio command variable by the DC/DC converter; the current IL flowing through the choke coil L; and the output current Io of the DC/DC converter 40.

Here, the boosting ratio command variable can be given by $V_{PN}/V_{IN}$, where $V_{IN}$ is the input voltage to the DC/DC converter 40, and $V_{PN}$ is its output voltage (=the voltage across the DC link capacitor 30=the input voltage to the inverter 20).

In the example illustrated in FIG. 4, when the boosting ratio command variable is greater than the carrier signal, the Gl signal becomes high and the switch SL at the low arm side is turned on. In contrast, when the boosting ratio command variable is less than the carrier signal, the Gl signal becomes low and the switch SL at the low arm side is turned off.

The choke coil current IL is a DC-like current on which ripple current is superimposed. The amplitude of the ripple of the choke coil current IL depends on the inductance of the choke coil L: the ripple becomes smaller with an increase of the inductance. The output current Io becomes a pulse-like current. As shown in FIG. 4, the boosting operation can be controlled by controlling the gate signal Gl of the switch SL.

Next, the voltage reduction operation of the DC/DC converter 40 will be described with reference to FIG. 5. The voltage reduction operation takes place when the power flows from the inverter 20 to the high voltage battery 50.

FIG. 5 illustrates the carrier signal of the DC/DC converter 40; the boosting ratio command variable; the gate signal Gh of the switch SH generated by the comparing operation of the DC/DC converter carrier signal with the boosting ratio command variable; the current IL flowing through the choke coil L; and the output current Io of the DC/DC converter 40.

In the example illustrated in FIG. 5, when the boosting ratio command variable is smaller than the carrier signal, the Gh signal becomes high and the switch SH at the high arm side is turned on. In contrast, when the boosting ratio command variable is greater than the carrier signal, the Gh signal becomes low and the switch SH at the high arm side is turned off.

As in the boosting operation, the choke coil current IL is a DC-like current on which ripple current is superimposed, and the output current Io becomes a pulse-like current. As shown in FIG. 5, the voltage reduction operation can be controlled by controlling the gate signal Gh of the switch SH.

Next, suppressing operation (minimizing operation) of the ripple current flowing through the DC link capacitor 30 in the embodiment 1 in accordance with the present invention will be described.

The current Icap flowing through the DC link capacitor 30 is the difference between the input current Ip of the inverter 20 and the output current Io of the DC/DC converter 40, and is represented by the following expression (1).

$$Icap=Ip-Io \quad (1)$$

As illustrated in FIGS. 3, 4 and 5, the input current Ip of the inverter 20 and the output current Io of the DC/DC converter 40 have a pulse-like current waveform. Accordingly, it will be conceived that bringing the pulse current of Ip into agreement with the pulse current of Io can reduce the current Icap of the DC link capacitor 30. To synchronize the pulse timing of the input current Ip of the inverter 20 and the pulse timing of the output current Io of the DC/DC converter 40, it is necessary to match the fundamental frequencies of the respective pulse currents, and the phases of the fundamental frequencies.

First, a method of matching the fundamental frequencies of the pulse currents Ip and Io will be described. The input current Ip of the inverter 20 has a pulse-like current waveform, and the pulse current waveform varies depending on the driving conditions of the inverter 20 such as the power factor and modulation factor. However, the fundamental frequency of the pulse current Ip is twice the carrier signal frequency of the inverter 20 regardless of the driving conditions of the inverter 20 as illustrated in FIG. 3. On the other hand, the fundamental frequency of the output current Io of the DC/DC converter 40 is equal to the carrier signal frequency of the DC/DC converter 40 as illustrated in FIGS. 4 and 5.

Therefore to match the fundamental frequency of the input current Ip of the inverter 20 and that of the output current Io of the DC/DC converter 40, it is necessary to set the carrier signal frequency of the DC/DC converter 40 at twice the carrier signal frequency of the inverter 20.

Next, a method of matching the phase of the input current Ip and that of the output current Io will be described. The input current Ip to the inverter 20 becomes zero (called "voltage zero vector mode" from now on) in the period in which all the high arm side switches SuH, SvH and SwH of the U-phase, V-phase and W-phase are in the ON state, or in the period in which all the low arm side switches SuL, SvL and SwL of the U-phase, V-phase and W-phase are in the ON state. Although the duration of the voltage zero vector mode of the inverter 20 changes depending on the driving conditions of the inverter such as the power factor and modulation factor, the inverter 20 is in the voltage zero vector mode without exception when the carrier signal of the inverter 20 is at peaks or valleys as illustrated in FIG. 3, and the input current Ip to the inverter 20 becomes zero.

Being averaged in each cycle of the motor current, the fundamental frequency component of the input current Ip has the minimum amplitude when the carrier signal of the inverter 20 is at peaks or valleys, and has the maximum amplitude when the carrier signal of the inverter 20 becomes zero.

On the other hand, during the boosting operation of the DC/DC converter 40, ON periods of the low arm side switch SL are energy storing periods of the choke coil L as illustrated in FIG. 4, and OFF periods of the low arm side switch SL are discharge periods of the energy (current) stored in the choke coil. Although the duration in which the output current Io of the DC/DC converter 40 is zero varies depending on the boosting ratio command variable, when the carrier signal of the DC/DC converter 40 is at valleys, the output current Io becomes zero without exception. Accordingly, the fundamental frequency component of the output current Io has the minimum amplitude when the carrier signal of the DC/DC converter 40 comes to the valleys, and has the maximum amplitude when the carrier signal of the DC/DC converter 40 comes to peaks.

Thus, the phase of the input current Ip to the inverter 20 and the phase of the output current Io of the DC/DC converter can be matched by matching the timing at which the fundamental frequency component of the input current Ip of the inverter 20 has the minimum amplitude and the timing at which the fundamental frequency component of the output current Io of the DC/DC converter 40 has the minimum amplitude. In other words, to match the phases of the currents Ip and Io, the phases of the individual carrier signals should be set in such a manner that the carrier signal of the DC/DC converter 40 comes to valleys at the timing when the carrier signal of the inverter 20 comes to the peaks or valleys.

Figure 6:
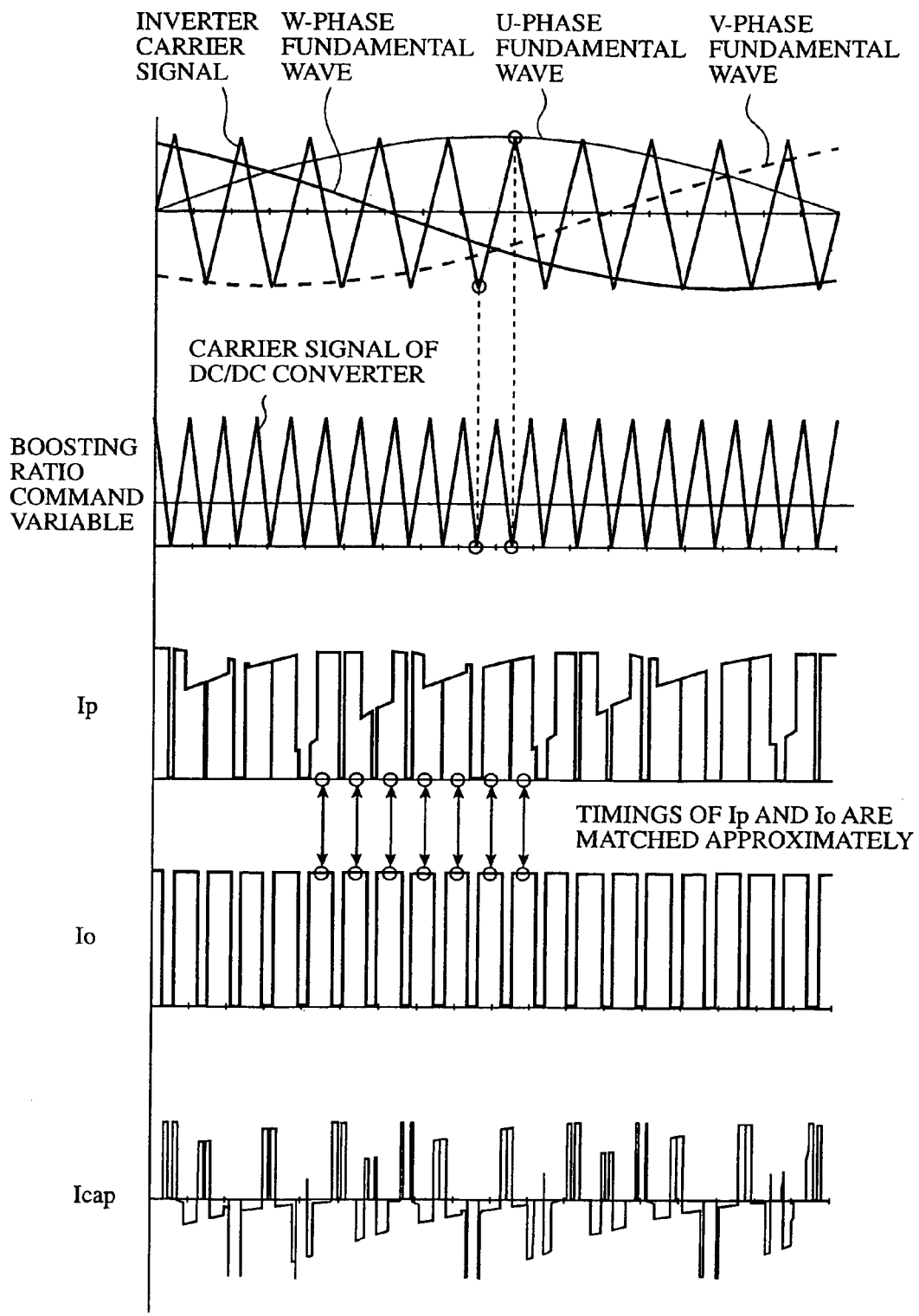
FIG. 6 is a diagram illustrating operation waveforms when the carrier signals of the inverter and DC/DC converter are optimized in the embodiment 1 in accordance with the present invention.
Figure 7:
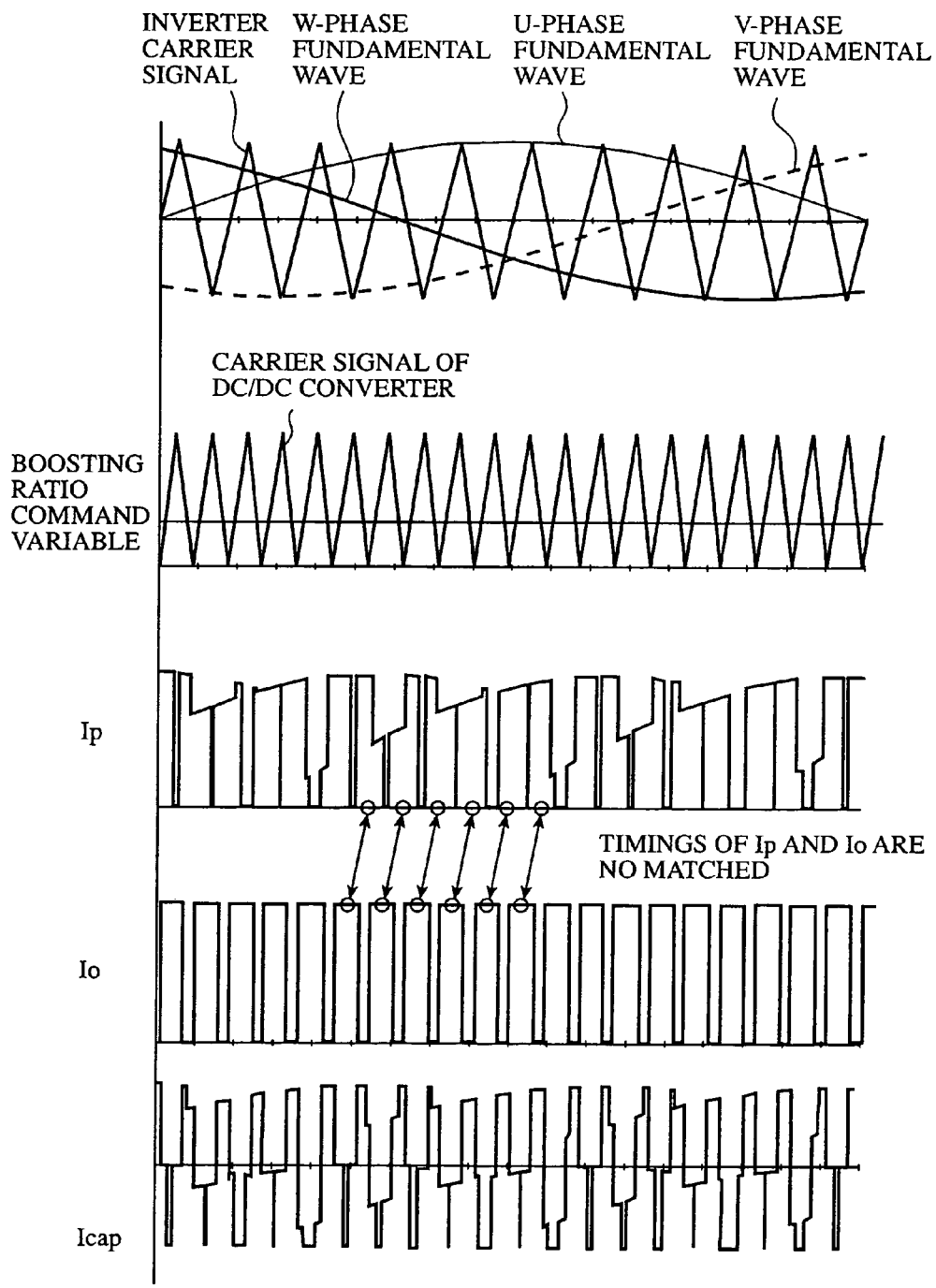
FIG. 7 is a diagram illustrating operation waveforms when the phases of the carrier signals of the inverter and DC/DC converter are not optimized.
Figure 8:
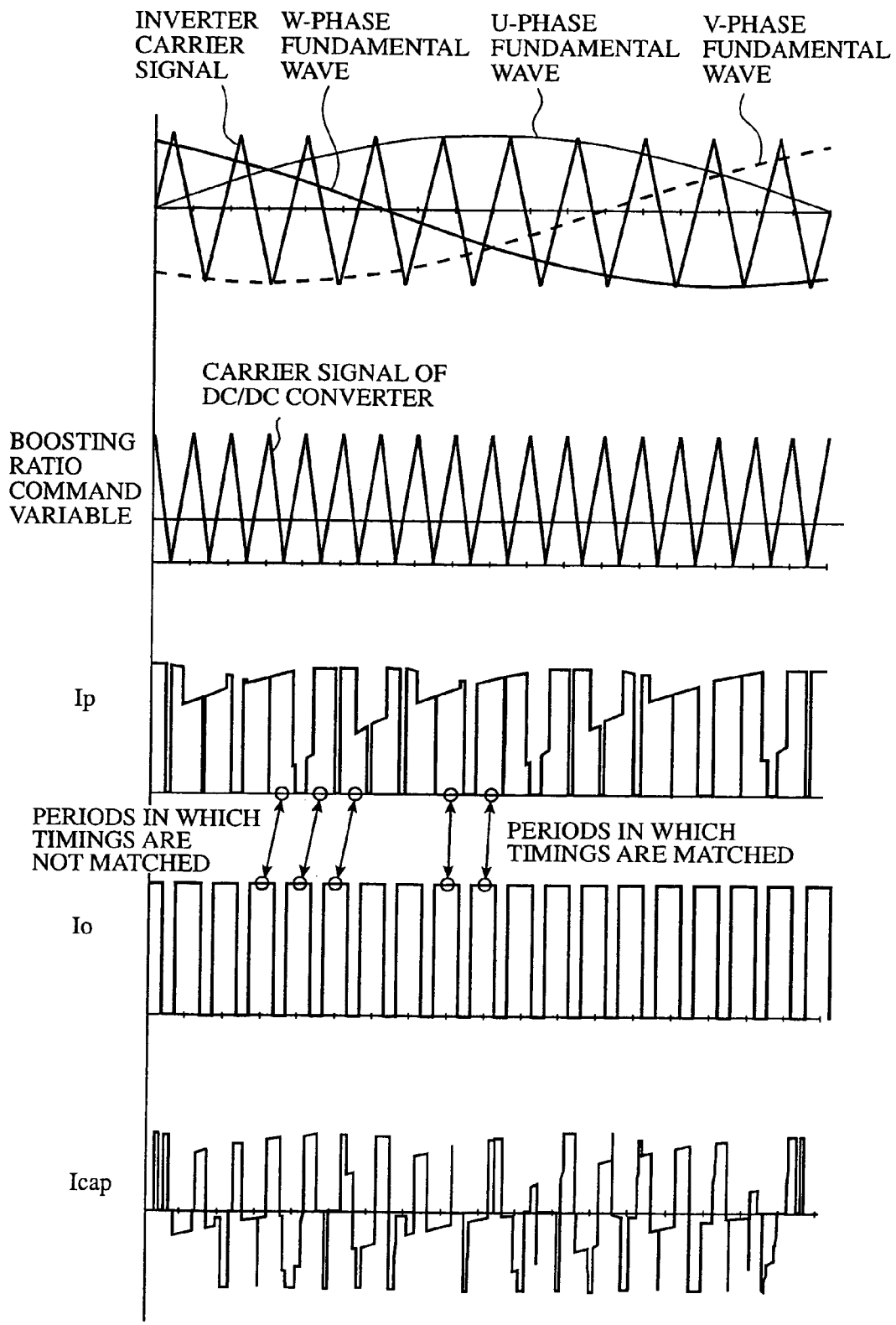
FIG. 8 is a diagram illustrating operation waveforms when the carrier signal frequency of the inverter is not synchronized with the carrier signal frequency of the DC/DC converter.

FIG. 6 is a diagram illustrating operation waveforms when the frequencies and phases of the carrier signals of the inverter 20 and DC/DC converter 40 are optimized by applying the foregoing method. On the other hand, FIG. 7 is a diagram illustrating operation waveforms when the phases of the carrier signals of the inverter 20 and DC/DC converter 40 are not optimized. In addition, FIG. 8 is a diagram illustrating operation waveforms when the carrier signal waveform of the inverter 20 and the carrier signal waveform of the DC/DC converter 40 are not synchronized. FIGS. 6-8 illustrate the carrier signal waveform of the inverter 20 and the carrier signal waveform of the DC/DC converter 40; the input current Ip of the inverter 20; the output current Io of the DC/DC converter 40; and the current Icap flowing through the DC link capacitor 30. Here, the driving conditions of the inverter 20 are: the modulation factor is 1.0; and the power factor is 0.9. In addition, the boosting ratio command variable of the DC/DC converter 40 is about 1.5.

As is clear from comparing FIG. 6 with FIG. 7, the embodiment 1, which optimizes the phases of the carrier signals of the inverter 20 and DC/DC converter 40, can match the timing of the input current Ip of the inverter 20 and the timing of the output current Io of the DC/DC converter 40, thereby being able to greatly reduce the effective value of the current Icap flowing through the DC link capacitor 30. In FIG. 8, on the other hand, since the carrier signal frequency of the inverter 20 and the carrier signal frequency of the DC/DC converter 40 are not synchronized, there are periods in which the timings of Ip and Io match, and period in which they do not match. As a result, comparing with the conditions of FIG. 7, although the effective value of the current Icap decreases, comparing with those of FIG. 6, the effective value of the current Icap increases.

Figure 9:
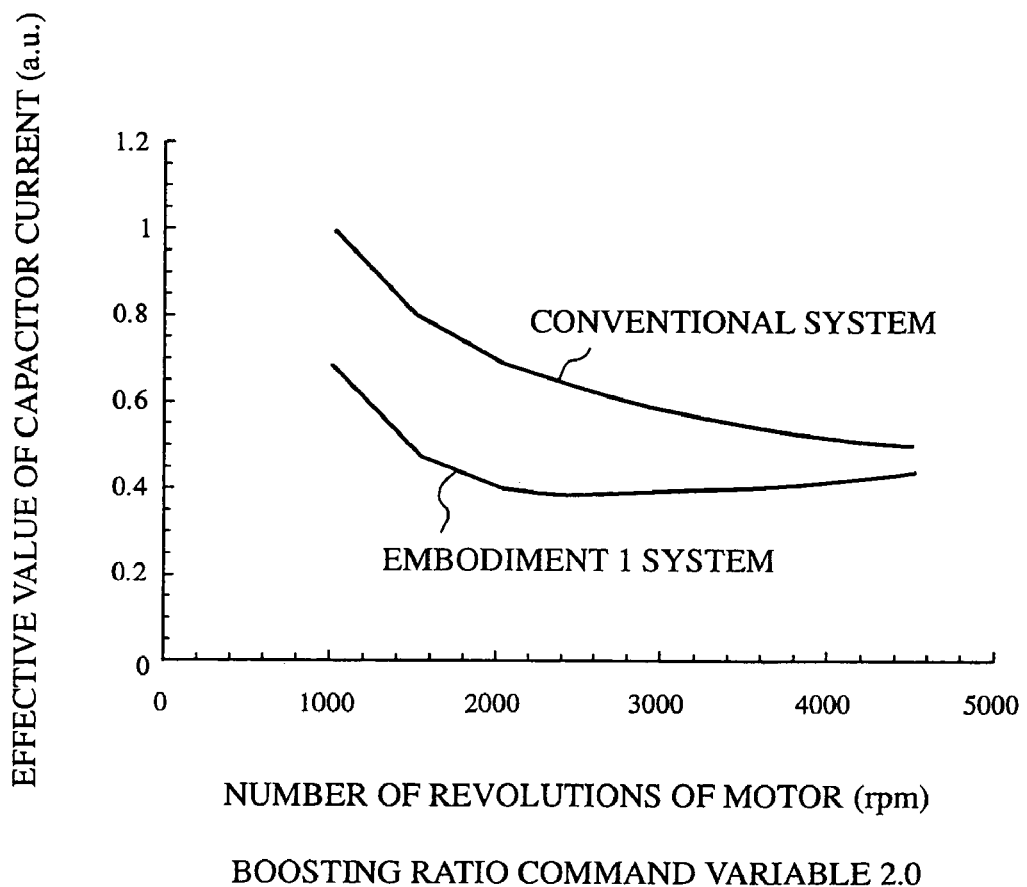
FIG. 9 is a graph illustrating effective current values flowing through the DC link capacitor when a motor is driven at rated power.

FIG. 9 is a graph illustrating effective values of the current flowing through the DC link capacitor 30 when operating the motor at the rated power. The effective values of the current as illustrated in FIG. 9 are relative values, and the effective value of the current is assumed to be unity when the number of revolutions of the motor is 1000 rpm in the conventional system in which the carrier signal waveform of the inverter 20 and the carrier signal waveform of the DC/DC converter 40 are not synchronized. Here, the boosting ratio command variable of the DC/DC converter 40 is assumed to be 2.0. As illustrated in FIG. 9, optimization of the carrier signals by the embodiment 1 enables the reduction of the effective values of the current of the DC link capacitor 30 throughout the range of the motor revolutions. In particular, in the range where the number of revolutions of the motor is 1000 rpm-3000 rpm, the current reduction effect of the DC link capacitor 30 is large, which enables the downsizing of the DC link capacitor 30.

Figure 10:
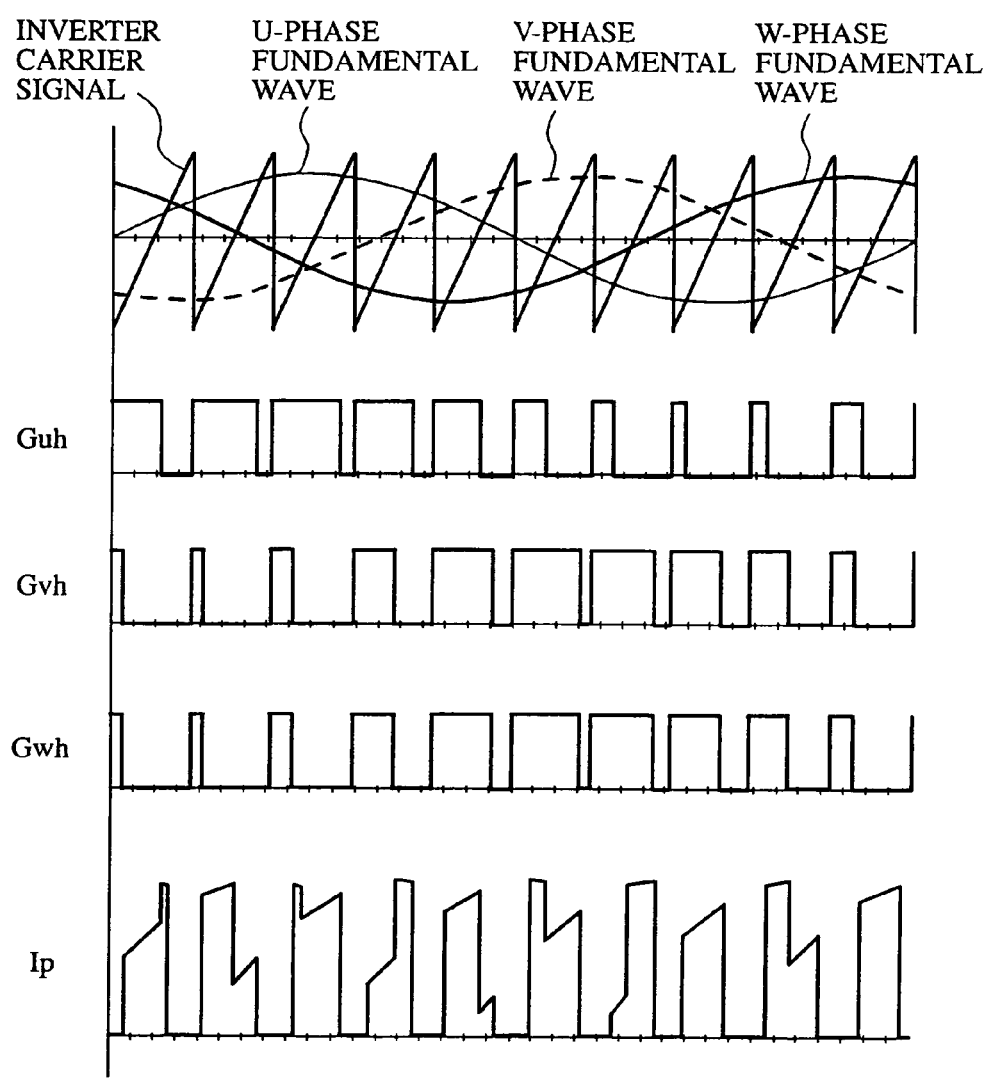
FIG. 10 is a diagram illustrating the operation when the carrier signal waveform of the inverter is a sawtooth waveform.

So far, the case is explained in which the carrier signal waveform of the inverter 20 is a triangular wave. In the case where the carrier signal waveform of the inverter 20 is a sawtooth wave, the relationships vary between the frequency of the carrier signal of the inverter 20 and the frequency of the carrier signal of the DC/DC converter 40. FIG. 10 is a diagram illustrating the operation when the carrier signal waveform of the inverter 20 is a sawtooth wave. As is clear from FIG. 10, when the carrier signal waveform of the inverter 20 is a sawtooth wave, the fundamental frequency of the input current Ip of the inverter 20 is equal to the carrier signal frequency. Accordingly, the carrier signal frequency of the DC/DC converter 40 can be made equal to the carrier signal frequency of the inverter 20.

In addition, as for the method of matching the phase of the input current Ip to the inverter 20 and the phase of the output current Io of the DC/DC converter 40, the method can be used that matches the timing at which the carrier signal waveform of the inverter 20 comes to peaks or valleys and the timing at which the carrier signal waveform of the DC/DC converter 40 comes to valleys as in the case where the carrier signal waveform of the inverter 20 is a triangular wave. However, in the case of the sawtooth wave, since the timing at which the carrier signal waveform of the inverter 20 comes to peaks coincides with the timing at which it comes to valleys, it is enough to match that timing to the timing at which the carrier signal waveform of the DC/DC converter 40 comes to valleys.

Figure 11:
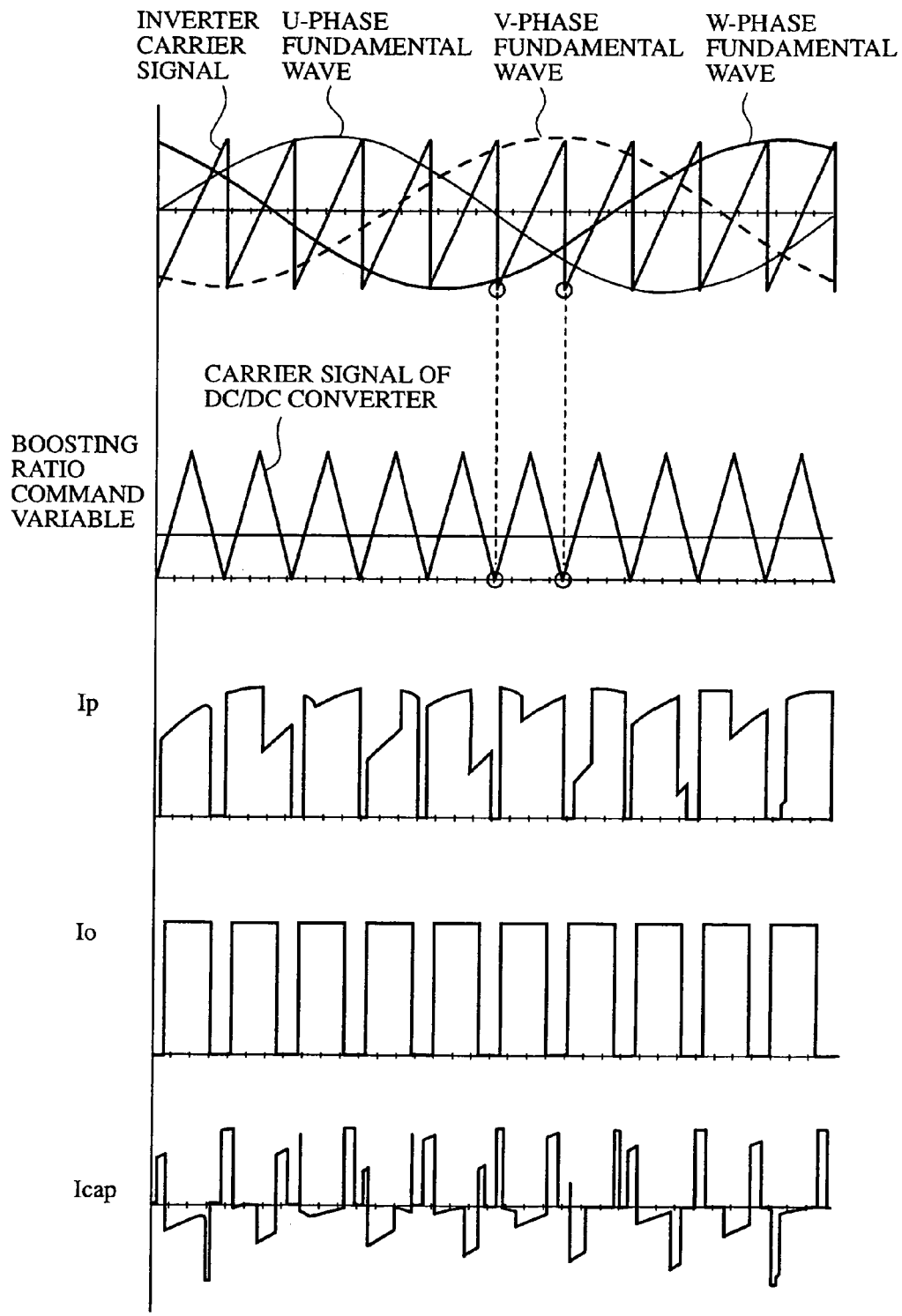
FIG. 11 is a diagram illustrating operation waveforms when the carrier signal of a sawtooth waveform-like triangular wave comparing type PWM inverter and the carrier signal of the DC/DC converter are optimized in the embodiment 1 in accordance with the present invention.

FIG. 11 is a diagram illustrating operation waveforms when applying the above-mentioned method, and optimizing the frequencies and phases of the carrier signal of the sawtooth waveform-like triangular wave comparing type PWM inverter 20, and of the carrier signal of the DC/DC converter 40. FIG. 11 illustrates the carrier signal waveform of the inverter 20 and the carrier signal waveform of the DC/DC converter 40; the input current Ip of the inverter 20; the output current Io of the DC/DC converter 40; and the current Icap flowing through the DC link capacitor 30.

As shown in FIG. 11, the embodiment 1, which optimizes the carrier signals of the sawtooth waveform-like triangular wave comparing type PWM inverter 20 and of the DC/DC converter 40, can match the timing of the input current Ip of the inverter 20 and the timing of the output current Io of the DC/DC converter 40. This makes it possible to reduce the effective value of the ripple current flowing through the DC link capacitor 30 in the sawtooth waveform-like triangular wave comparing type PWM inverter 20, thereby being able to downsize the DC link capacitor 30.

So far, it is designed such that the lower side switch SL, one of the power control switches of the DC/DC converter 40, is turned on when the boosting ratio command variable becomes greater than the carrier signal waveform, and is turned off when the boosting ratio command variable becomes less than the carrier signal waveform. Some other DC/DC converter 40 may turn on the lower side switch SL when the boosting ratio command variable becomes less than the carrier signal waveform, and turns off when the boosting ratio command variable becomes greater than the carrier signal waveform.

In this case, the output current Io of the DC/DC converter 40 becomes zero when the carrier signal waveform comes to peaks, and the amplitude of the fundamental frequency component of Io becomes maximum when the carrier signal waveform of the DC/DC converter 40 comes to valleys. Accordingly, to match the timing of the input current Ip of the inverter 20 and the timing of the output current Io of the DC/DC converter 40, the phases of the carrier signals should be set in such a manner that the carrier signal of the DC/DC converter 40 comes to peaks at the timing when the carrier signal waveform of the inverter 20 comes to peaks or valleys.

Thus, although the relationships between the phase of the carrier signal of the inverter 20 and the phase of the carrier signal of the DC/DC converter 40 differ depending on the comparing method between the carrier signal and the boosting ratio command variable of the DC/DC converter 40, the ripple current flowing through the DC link capacitor 30 can be reduced by matching the central timing of the period during which the inverter 20 is in the voltage zero vector mode and the central timing of the period during which the lower side switch SL of the DC/DC converter 40 maintains the ON state.

Next, the case in which the inverter 20 consists of a space voltage vector control PWM inverter will be described. The space voltage vector control is a system that outputs, in a voltage command vector space, three instantaneous voltage vectors that form the vertices of an equilateral triangle area during a constant period, and outputs the voltage command vector as the time average of them.

Figure 12:
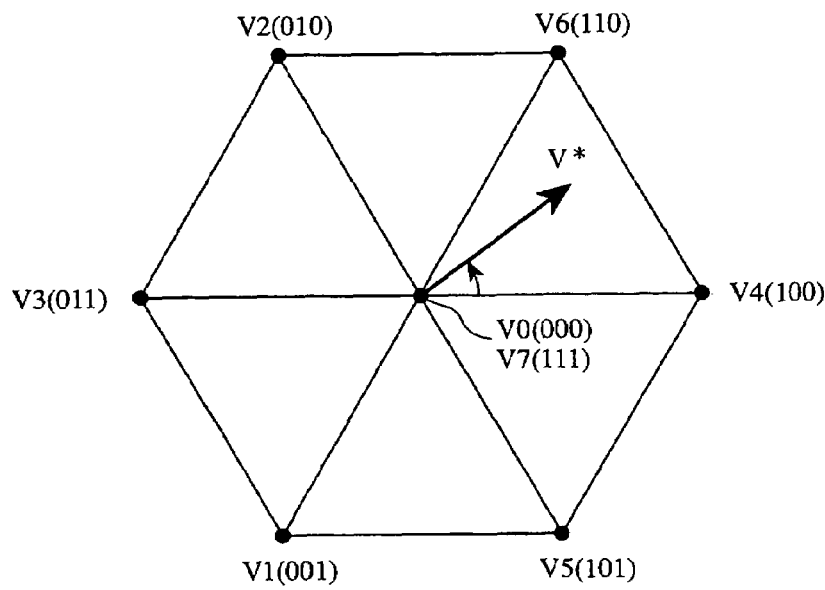
FIG. 12 is a diagram illustrating space voltage vector control.

FIG. 12 is a diagram illustrating the space voltage vector control. In the voltage vector space, voltage vectors V0-V7 represent instantaneous output voltage states of the U, V and W phases of the inverter 20. The vector V0(0, 0, 0) represents a state in which all the low arm side switches SuL, SvL and SwL of U, V and W phases are in the ON state, and V7 (1, 1, 1) represents a state in which all the high arm side switches SuH, SvH and SwH of the U, V and W phases are in the ON state. The vectors V0 and V7 each represent the voltage zero vector mode. In addition, the vector V6(1, 1, 0), for example, represents a state in which the higher side switches SuH and SvH of the U and V phases are in the ON state, and the higher side switch SwH of the W phase is in the OFF state.

Figure 13:
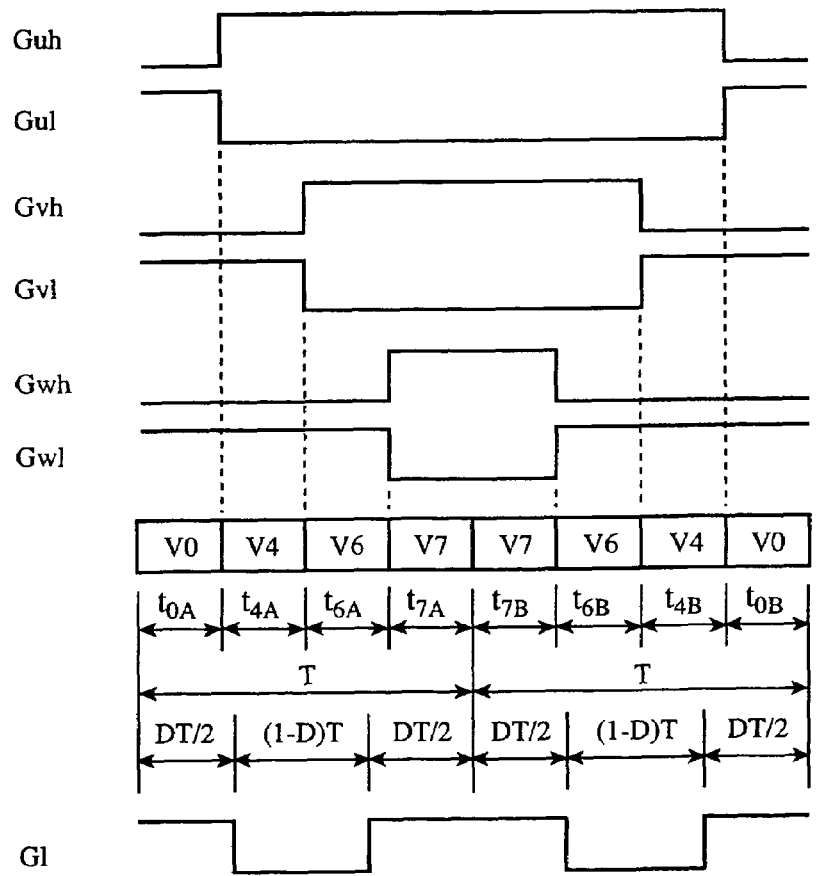
FIG. 13 is a diagram illustrating an example of a switching pattern by the space voltage vector control.

FIG. 13 is a diagram illustrating an example of the switching pattern based on the space voltage vector control when the voltage command vector V* is present in the equilateral triangle V0(V7)V4V6. In FIG. 13, D designates the on-duty of the DC/DC converter 40 which is in a range of $0 \leq D < 1$. The on-duty D increases with an increase of the boosting ratio in the boosting operation, and decreases with a decrease of the voltage reduction ratio in the voltage reduction operation. The symbol T represents a switching period.

In the switching pattern as illustrated in FIG. 13, the voltage vectors V0, V4, V6 and V7 are each selected once in a single switching period T. The time ratios of the voltage vectors are determined in response to the voltage command vector V*. As illustrated in FIG. 13, the inverter 20 enters the voltage zero vector mode twice during the period T: it occurs twice at first half $t_0$ and at second half $t_7$ of the period T; and at first half $t_7$ and at second half $t_0$ of the next period T, which take place alternately. Although the time periods $t_0$, $t_4$, $t_6$ and $t_7$ vary every moment in accordance with the changes of the voltage command vector V*, the relationships $t_{0A} \approx t_{0B}$ and $t_{7A} \approx t_{7B}$ hold in the adjacent switching periods as illustrated in FIG. 13. As a result, the duration $2 \times t_0$ or $2 \times t_7$ around the switching timing at which the switching period T shifts becomes the duration of the voltage zero vector mode.

Thus, in the switching pattern as shown in FIG. 13, the timing at which the switching period T shifts is the timing at which the amplitude of the fundamental frequency component of the input current Ip of the inverter 20 becomes minimum. Accordingly, as for the switching timing of the control switches of the DC/DC converter 40, the switch SL should be set in the ON state in the boosting operation and the switch SH should be set in the ON state in the voltage reduction operation for the time period $D \times T/2$ from the time of the shift of the switching period T of the inverter 20, followed by setting them in the OFF state for the time period $(1-D) \times T$. By carrying out such switching timing, it becomes possible to match the phases of the fundamental frequency components of the pulse currents Ip and Io, thereby being able to reduce the current Icap flowing through the DC link capacitor 30.

Figure 14:
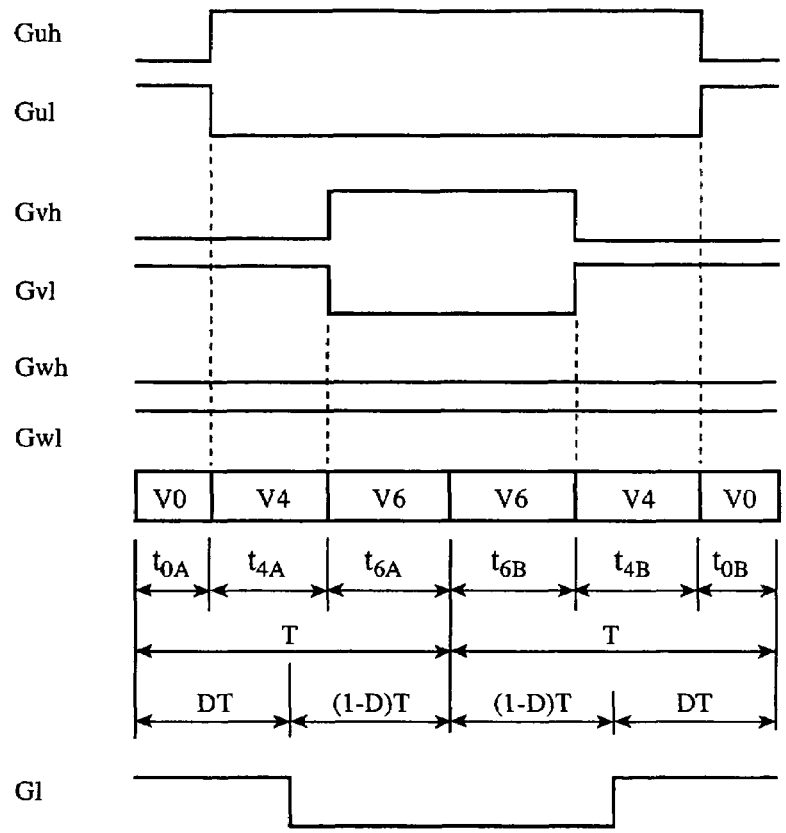
FIG. 14 is a diagram illustrating another example of the switching pattern by the space voltage vector control.

FIG. 14 is a diagram illustrating another example of a switching pattern of the space voltage vector control. FIG. 14 illustrates the switching pattern for outputting the voltage command vector V* in the state in which the W-phase switching is halted to reduce the switching loss when the voltage command vector V* is present in the equilateral triangle V0(V7)V4V6.

In the case of FIG. 14, the instantaneous voltage output has three patterns V0, V4 and V6, and the inverter 20 enters the voltage zero vector mode only in the state in which all the low arm side switches SuL, SvL and SwL are in the ON state. Thus, the voltage zero vector mode occurs once per period T, and the pattern in which the voltage zero vector mode occurs in the first half of the period T and the pattern in which it occurs in the second half of the period T take place alternately. As a result, the voltage zero vector mode continues for the time period $2 \times t_0$ around the timing at which the switching period 2T shifts.

Thus, in the switching pattern as shown in FIG. 14, the timing at which the switching period T shifts is the timing at which the amplitude of the fundamental frequency component of the input current Ip of the inverter 20 becomes minimum. Accordingly, as for the switching timing of the DC/DC converter 40, the switch SL should be in the ON state in the boosting operation and the switch SH should be in the ON state in the voltage reduction operation for the time period D×T from the time of the shift of the switching period 2T of the inverter 20, followed by keeping them OFF for the time period (1−D)×2T. By such switching timing, it becomes possible to match the phases of the fundamental frequency components of the pulse currents Ip and Io, thereby being able to reduce the current Icap flowing through the DC link capacitor 30.

So far, in the individual control methods of the triangular wave comparing PWM inverter, sawtooth wave comparing PWM inverter and space voltage vector control PWM inverter, the switching timings of the semiconductor devices are described which can best suppress the ripple current flowing through the DC link capacitor 30. However, it is not necessary for the switching timings of the semiconductor devices to match to each other precisely. Even if the switching timings deviate slightly, the suppression effect of the ripple current of the DC link capacitor 30 can be achieved.

Figure 15:
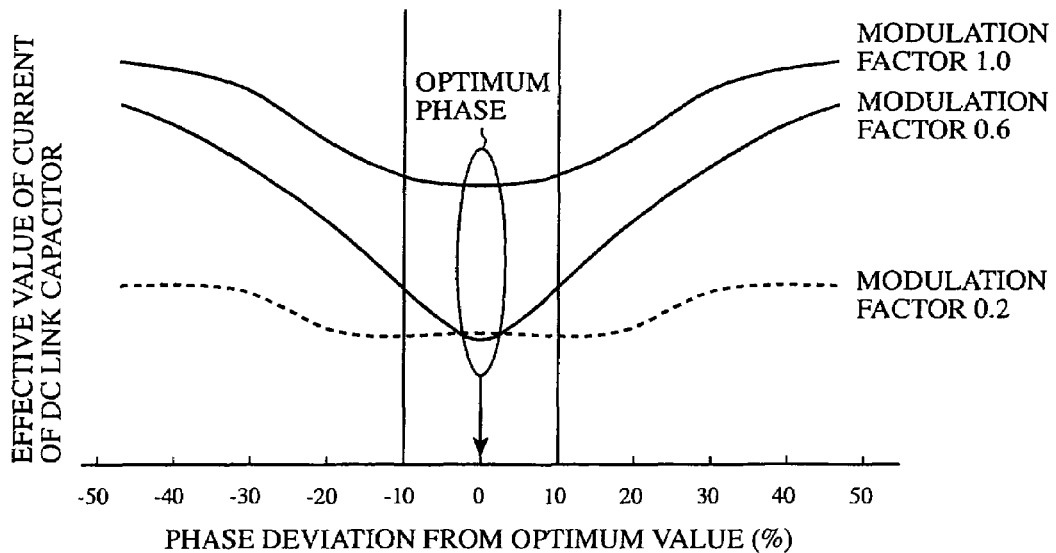
FIG. 15 is a graph illustrating relationships between switching timing deviations and relative values of the current flowing through the DC link capacitor.

FIG. 15 is a graph illustrating relationships between the switching timing deviations of the DC/DC converter 40 and the relative values of the ripple current flowing through the DC link capacitor 30, when the power factor of the inverter 20 is 0.9, and the modulation factor thereof is 0.2, 0.6 and 1.0. It is seen from FIG. 15 that even if the switching timing deviates from the optimum phase value a little, the suppressing effect of the ripple current of the DC link capacitor 30 is achieved regardless of the modulation factor. Although depending on the driving conditions of the inverter 20, it is seen that if the deviation of the switching timing is within ±10% of the switching period of the DC/DC converter 40, sufficient effect is obtained.

As a simpler control method, the ripple current of the DC link capacitor 30 can be reduced by approximately matching the timing at which the inverter 20 shifts to the voltage zero vector mode and the timing at which the lower side switch SL of the DC/DC converter 40 is turned on.

Figure 16:
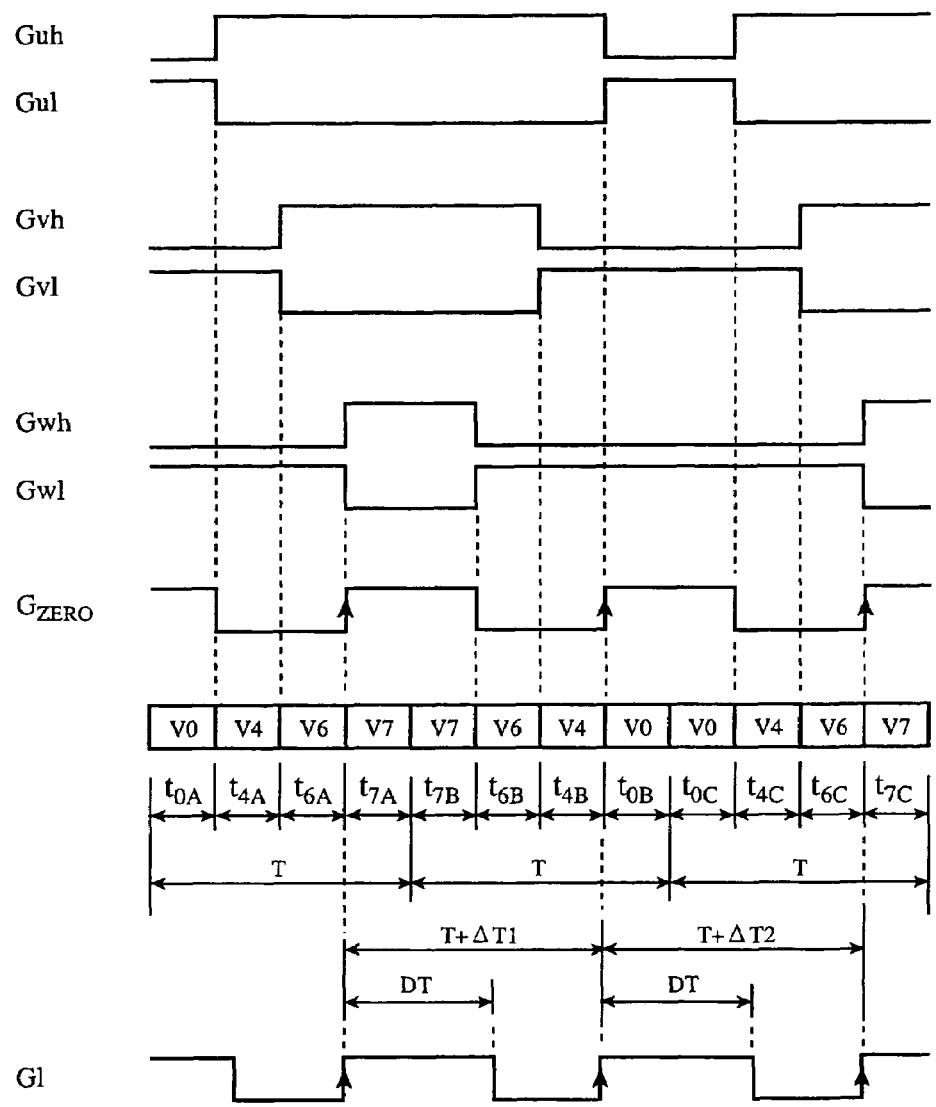
FIG. 16 is a diagram illustrating relationships between the switching timing of the inverter and the switching timing of the DC/DC converter in another switching control method of the embodiment 1.

FIG. 16 is a diagram illustrating relationships between the switching timing of the inverter 20 and the switching timing of the DC/DC converter 40 according to this control method. In FIG. 16, the symbol $G_{ZERO}$ designates a voltage zero vector signal, which is high during the time when the inverter 20 is in the voltage zero vector mode, and is low during the remaining time. As shown in FIG. 16, the lower side switch SL of the DC/DC converter 40 is in the ON state for the time D×T from the time at which the inverter 20 shifts to the voltage zero vector mode. During the remaining time, the switch SL is in the OFF state. Incidentally, the timing at which the inverter 20 shifts to the voltage zero vector mode does not occur at the constant period T, but occurs at irregular periods T±ΔT, where ΔT is a value that changes at every moment depending on the switching state of the inverter 20, but the average value of ΔT is nearly zero.

Accordingly, when such a control method is used, and when the on-duty D of the DC/DC converter 40 is constant, although the ON duration of the lower side switch SL of the DC/DC converter 40 is constant, the OFF duration of the switch SL is (1−D)×(T±ΔT), which is not constant.

Alternatively, the reduction of the ripple current of the DC link capacitor 30 can be carried out by approximately matching the timing at which the inverter 20 shifts from the voltage zero vector mode to a state other than the voltage zero vector and the timing at which the lower side switch SL of the DC/DC converter 40 is turned off.

Figure 17:
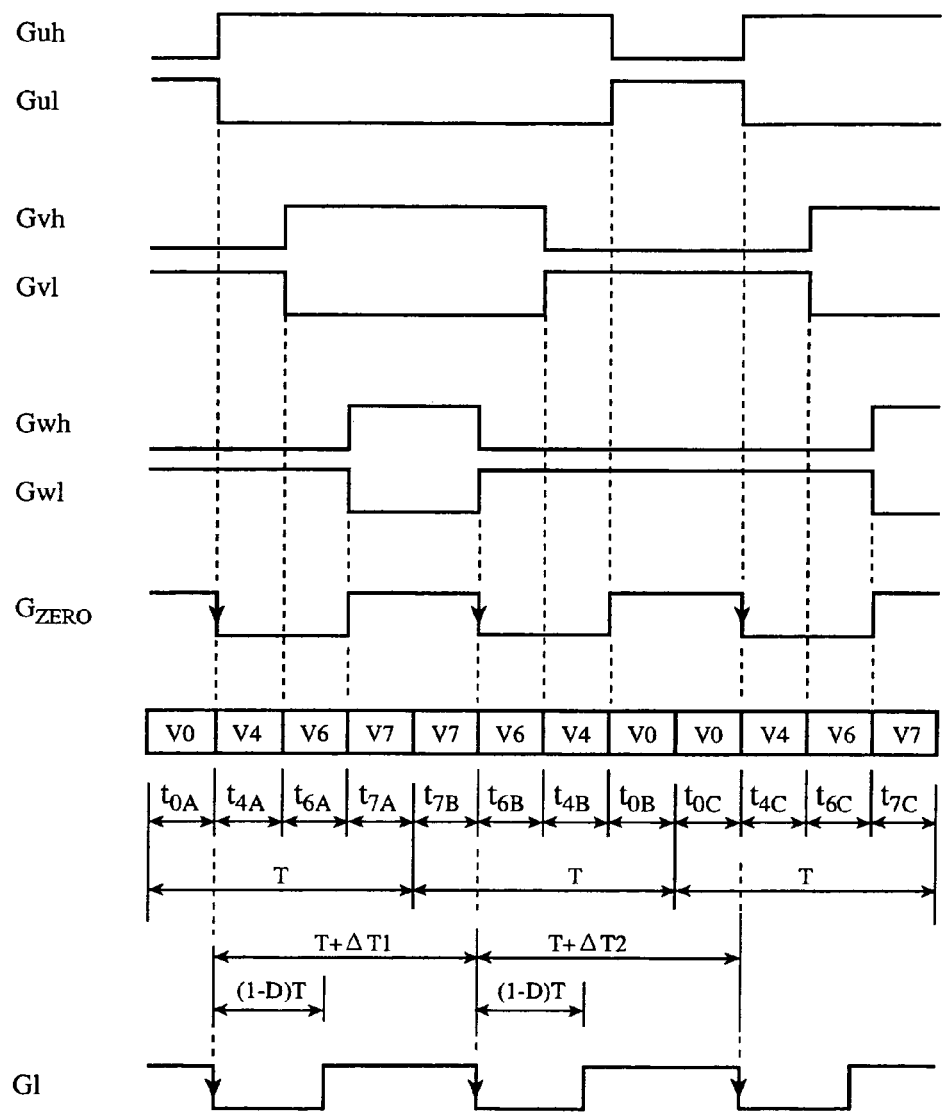
FIG. 17 is a diagram illustrating relationships between the switching timing of the inverter and the switching timing of the DC/DC converter in another switching control method of the embodiment 1.

FIG. 17 is a diagram illustrating relationships between the switching timing of the inverter 20 and the switching timing of the DC/DC converter 40 according to the control method. As shown in FIG. 17, the lower side switch SL of the DC/DC converter 40 is in the OFF state for the time period (1−D)×T from the time when the inverter 20 shifts from the voltage zero vector mode to the other instantaneous voltage value. During the remaining time, the switch SL is in the ON state. Incidentally, the timing at which the inverter 20 shifts from the voltage zero vector mode to the other instantaneous voltage value does not occur at the constant period T, but occurs at irregular periods T±ΔT, where ΔT is a value that varies at every moment depending on the switching state of the inverter 20, but the average value of ΔT is nearly zero.

Accordingly, when such a control method is used, and when the on-duty D of the DC/DC converter 40 is constant, although the OFF duration of the lower side switch SL of the DC/DC converter 40 is constant, the ON duration of the switch SL is D×(T+ΔT), which is not constant.

Although the boosting operation of the DC/DC converter 40 has been described so far, the fundamental operation of the voltage reduction operation of the DC/DC converter 40 is the same. They differ in that although the lower side switch SL controls the DC/DC converter 40 in the boosting operation, the higher side switch SH controls the DC/DC converter 40 in the voltage reduction operation.

So far, the comparing operation method of the DC/DC converter 40 has been described by way of example in which when the boosting ratio command variable is greater than the carrier signal, the lower side switch SL is in the ON state, and the higher side switch SH is in the OFF state; whereas when the boosting ratio command variable is less than the carrier signal, the lower side switch SL is in the OFF state, and the higher side switch SH is in the ON state. However, this is not essential: when the comparing operation method of the DC/DC converter 40 is opposite, the carrier signal phases can be set in such a manner that the carrier signal waveform of the DC/DC converter 40 comes to peaks at the time when the carrier signal waveform of the inverter 20 comes to peaks or valleys.

As described above, the embodiment 1 can reduce the current Icap flowing through the DC link capacitor 30, and hence can further downsize the DC link capacitor 30 by configuring such that the frequency of the carrier signal of the inverter 20 and the frequency of the carrier signal of the DC/DC converter 40 are synchronized, and the frequency of the carrier signal of the DC/DC converter 40 is made equal to or twice the frequency of the carrier signal of the inverter 20 so that when all the lower side switches of the inverter 20 are in the ON state, or when all the higher side switches thereof are in the ON state (voltage zero vector mode), some time period is present when the output current Io of the DC/DC converter 40 is zero.

In addition, the embodiment 1 can minimize the current Icap flowing through the DC link capacitor 30, and hence can further downsize the DC link capacitor 30 by approximately matching the center timing of the period during which the inverter 20 is in the voltage zero vector mode and the center timing of the period during which the output current Io of the DC/DC converter 40 is zero.

Furthermore, the embodiment 1 can minimize the current Icap flowing through the DC link capacitor 30, and hence can further downsize the DC link capacitor 30 by configuring such that the inverter 20 and DC/DC converter 40 carry out the triangular wave comparing type PWM control, and that the timing at which the carrier signal waveform of the inverter 20 comes to peaks and valleys and the timing at which the carrier signal waveform of the DC/DC converter 40 comes to valleys or peaks are approximately matched.

Moreover, the embodiment 1 can reduce the current Icap flowing through the DC link capacitor 30, and hence can further downsize the DC link capacitor 30 by approximately matching the timing at which the inverter 20 shifts to the voltage zero vector mode and the timing at which the output current of the DC/DC converter 40 becomes zero.

Finally, the embodiment 1 can reduce the current Icap flowing through the DC link capacitor 30, and hence can further downsize the DC link capacitor 30 by approximately matching the timing at which the inverter 20 shifts from the voltage zero vector mode to the state other than the voltage zero vector and the timing at which the output current of the DC/DC converter 40 starts to flow.

Embodiment 2

Figure 18:
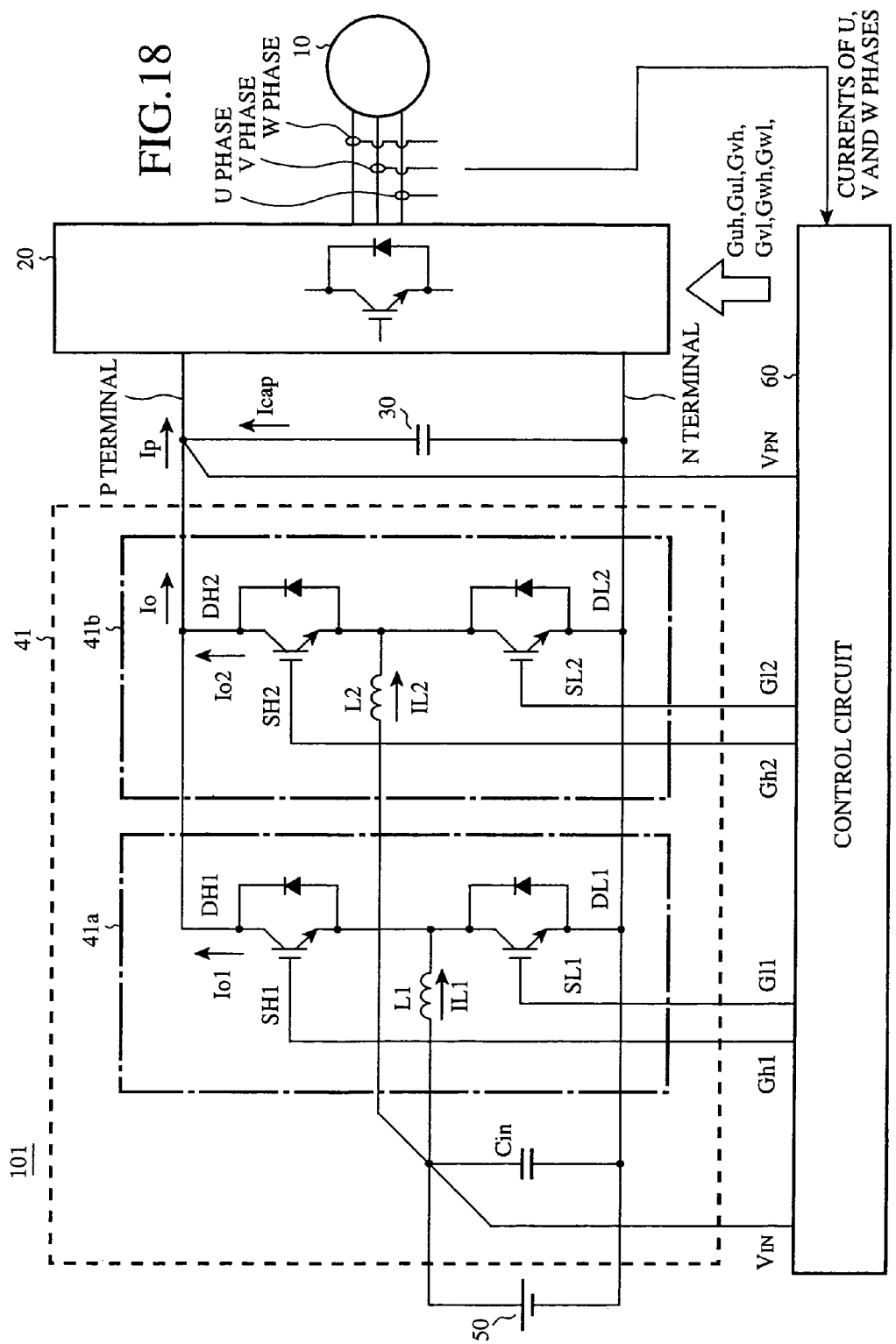
FIG. 18 is a block diagram showing a configuration of a motor driving apparatus of an embodiment 2 in accordance with the present invention.

FIG. 18 is a block diagram showing a configuration of a motor driving apparatus 101 of an embodiment 2 in accordance with the present invention. In FIG. 18, the same reference numerals designate the same components as those of FIG. 1. The present embodiment 2 differs from the embodiment 1 in that the DC/DC converter 41 has a multiphase (2-phase in this case) scheme. The DC/DC converter 41 includes a DC/DC converter 41a and a DC/DC converter 41b. The multiphase DC/DC converter comprises a plurality of DC/DC converters connected in parallel, and operates the individual DC/DC converters with shifting their output phases. The chief merit of the multiphase DC/DC converter is that it can reduce the ripple current of the input voltage smoothing capacitor Cin and that of the DC link capacitor 30. Its demerit is that since it must control a plurality of DC/DC converters, the controller becomes complicated. Therefore the multiphase DC/DC converter is used to constitute a comparatively large capacity DC/DC converter.

Next, the operation of the preset embodiment 2 will be described.

First, the operation of the 2-phase DC/DC converter 41 will be described. Although there are a variety of control methods of the 2-phase DC/DC converter 41, the embodiment 2 employs the method that shifts the phase of the carrier signal of the DC/DC converter 41a from that of the DC/DC converter 41b by 180 degrees.

Figure 19:
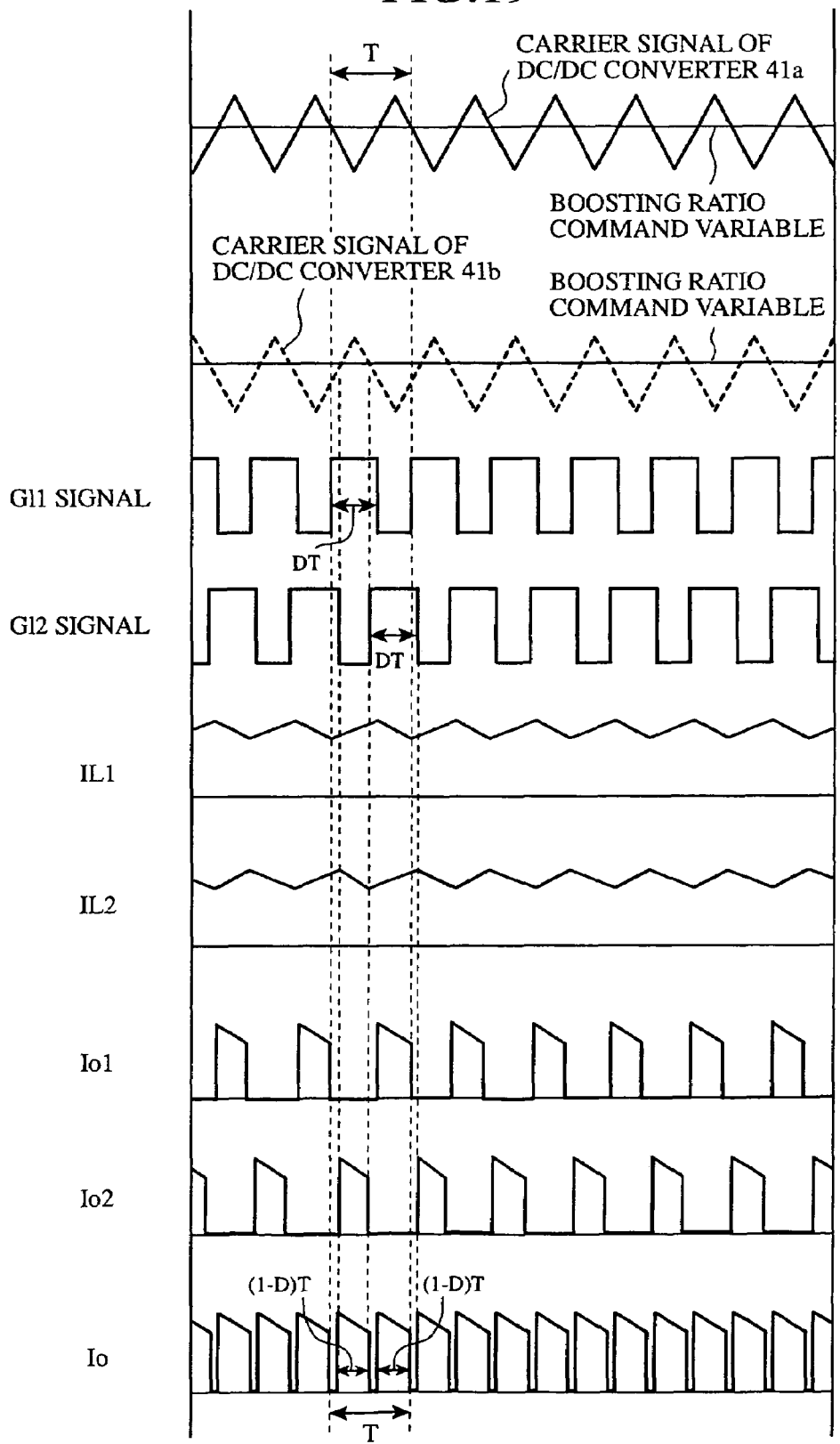
FIG. 19 is a diagram illustrating the boosting operation of a 2-phase DC/DC converter.

The reason for shifting the carrier signal phases of the DC/DC converters 41a and 41b by 180 degrees will be described. FIG. 19 is a diagram illustrating the boosting operation of the 2-phase DC/DC converter 41. Here, the on-duty D of the DC/DC converters 41a and 41b is 0.6. The reference symbols G11 is the control signal fed to the lower side switch SL1 of the DC/DC converter 41a, and G12 is the control signal fed to the lower side switch SL2 of the DC/DC converter 41b. The phases of the control signals G11 and G12 are shifted by 180 degrees. The reference symbols IL1 and IL2 designate currents flowing through choke coils L1 and L2 of the DC/DC converters 41a and 41b. The currents IL1 and IL2 are controlled by the control circuit 60 in such a manner that they have approximately the same value. Reference symbols Io1 and Io2 designate output currents of the DC/DC converters 41a and 41b. The output current Io of the DC/DC converter 41 is equal to the sum total of Io1 and Io2.

As for the output current waveform of the DC/DC converter 41, a pulse current with a pulse width (1−D)×T is output twice during the carrier signal period T of the DC/DC converter 41. The output current Io is zero in the remaining time.

Thus shifting the carrier phases of the two DC/DC converters by 180 degrees enables the DC/DC converters 41a and 41b to produce their output currents Io1 and Io2 alternately, thereby being able to increase the fundamental frequency of the output current Io of the DC/DC converter 41 to twice the carrier signal frequency of the DC/DC converter 41.

Next, the suppressing operation (minimizing operation) of the ripple current flowing through the DC link capacitor 30 will be described.

It is the same as in the embodiment 1 that the current Icap of the DC link capacitor 30 can be reduced by matching the fundamental frequencies of the pulse currents of the input current Ip of the inverter 20 and of the output current Io of the DC/DC converter 41, and by matching the phases of the fundamental frequency components.

The input current Ip of the inverter 20 has a pulse-like current waveform, and the fundamental frequency of the input current Ip is twice the inverter carrier signal frequency in the triangular wave comparing type PWM inverter. As for the fundamental frequency of the output current Io of the 2-phase DC/DC converter 41, it becomes twice the carrier signal frequency of the DC/DC converter 41 by shifting the carrier phases of the DC/DC converters 41a and 41b by 180 degrees. Accordingly, to match the fundamental frequency of the input current Ip of the inverter 20 and that of the output current Io of the DC/DC converter 41, the frequency of the carrier signal of the DC/DC converter 41 and the frequency of the carrier signal of the inverter 20 should be matched.

Next, a method of matching the phase of the input current Ip of the inverter 20 and that of the output current Io of the DC/DC converter 41 will be described.

As described before, when the DC/DC converters 41a and 41b have the on-duty D of 0.6, the output current Io of the DC/DC converter 41 has a period in which it is zero. The period agrees with a period in which the lower side switches SL1 and SL2 of the two DC/DC converters 41a and 41b are both in the ON state. Accordingly, the phase of the input current Ip of the inverter 20 and the phase of the output current Io of the DC/DC converter 41 can be matched by matching the timing at which the inverter 20 enters the voltage zero vector mode and the timing at which the lower side switches SL1 and SL2 of the DC/DC converters 41a and 41b are both turned on.

Figure 20:
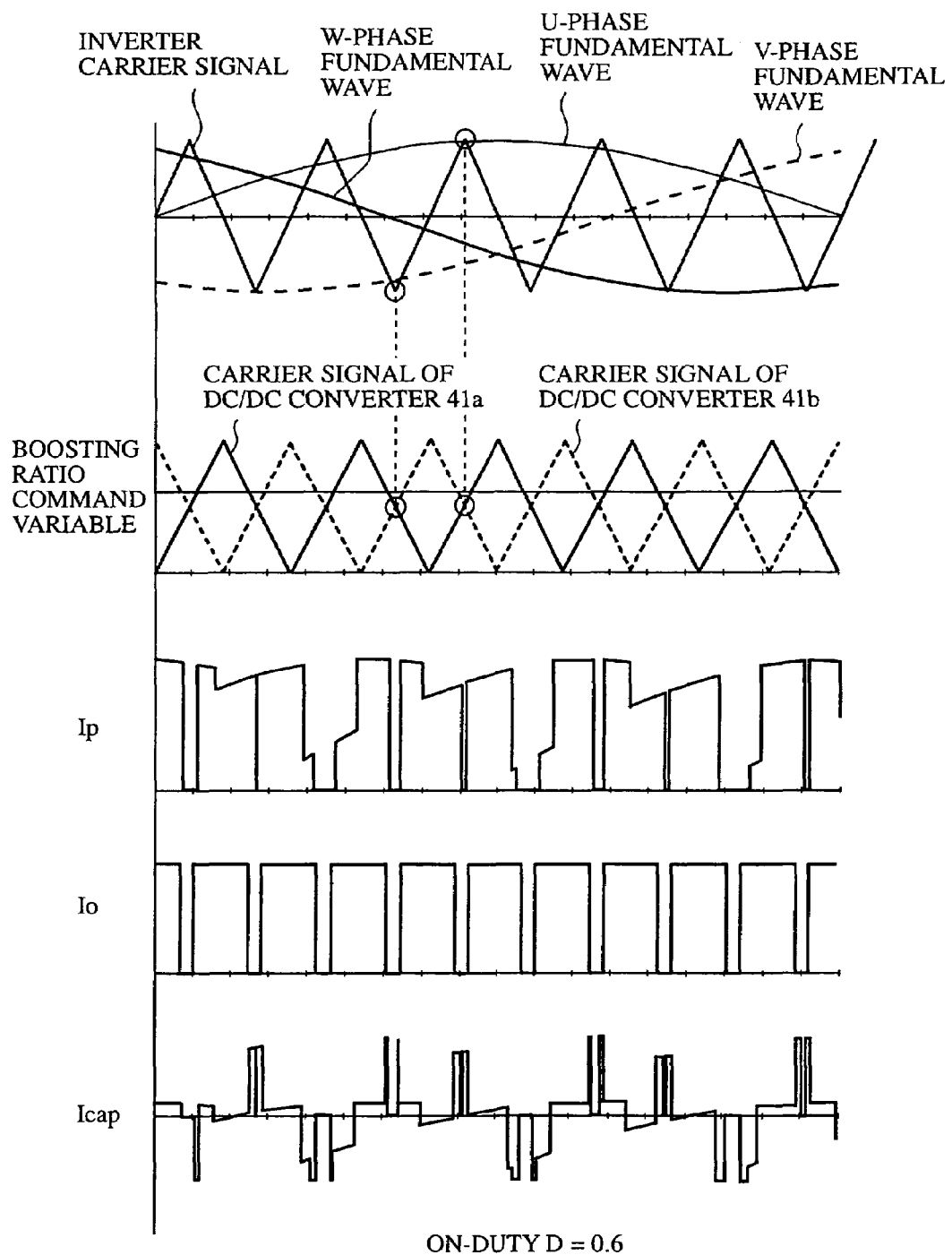
FIG. 20 is a diagram illustrating operation waveforms when the carrier signals of the inverter and DC/DC converter are optimized in the embodiment 2 in accordance with the present invention.
Figure 21:
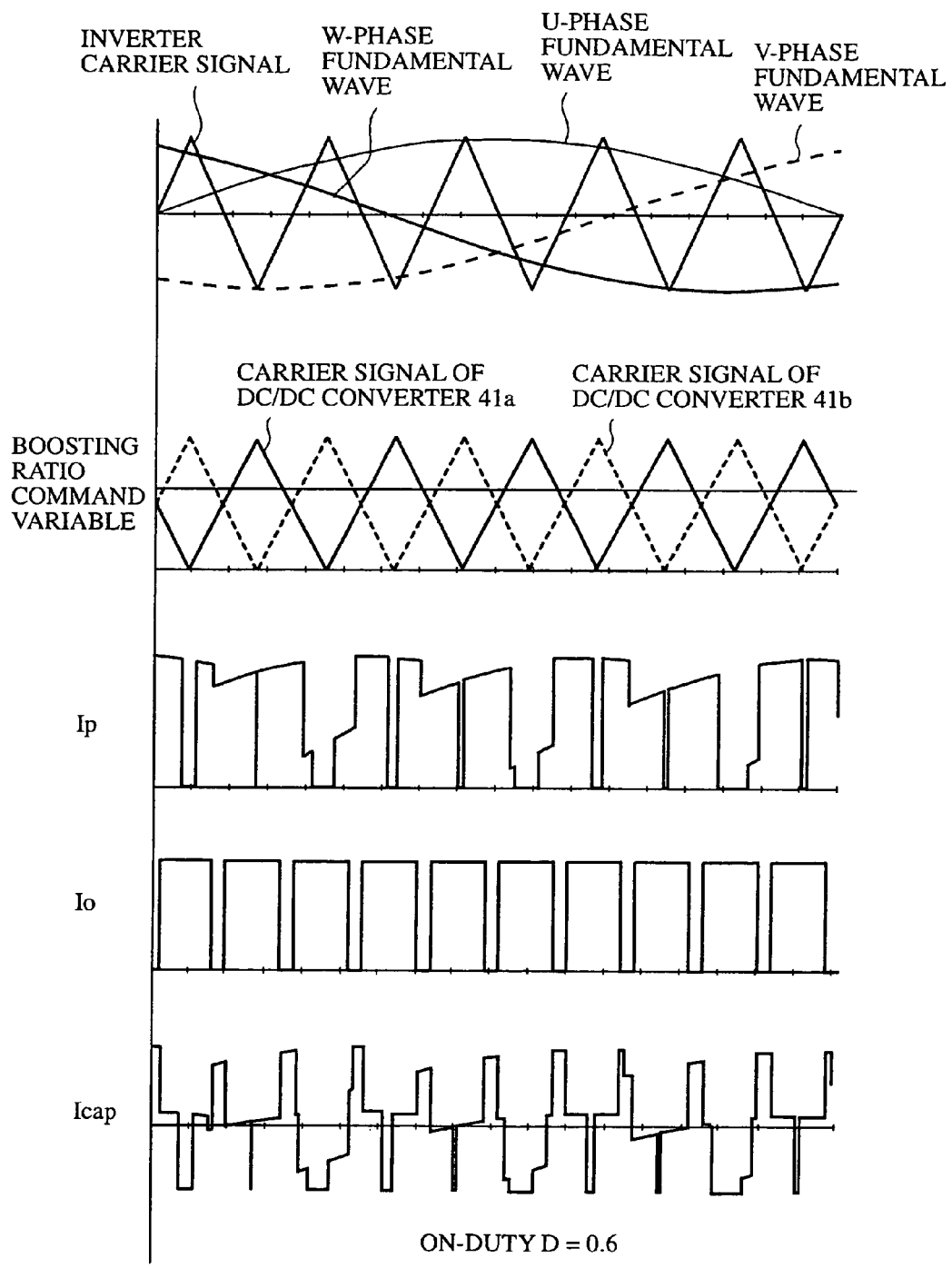
FIG. 21 is a diagram illustrating operation waveforms when the phases of the carrier signals of the inverter and DC/DC converter are not optimized.

FIG. 20 is a diagram illustrating operation waveforms when optimizing the phases of the carrier signals of the triangular wave comparing type PWM inverter 20 and of the DC/DC converter 41 by applying the foregoing method. As shown in FIG. 20, the timing at which the carrier signal of the inverter 20 comes to peaks and valleys is approximately matched to the timing at which the carrier signals of the DC/DC converters 41a and 41b come to the midpoints of peaks and valleys. FIG. 21 is a diagram illustrating operation waveforms when the phase of the carrier signal of the inverter 20 and the phase of the carrier signal of the DC/DC converter 41 are not optimized. Here, the inverter 20 has the driving conditions that the modulation factor is 1.0 and the power factor is 0.9, and the DC/DC converter 41 has the boosting ratio command variable of 2.5.

As is clear by comparing FIG. 20 with FIG. 21, the phase optimization by the embodiment 2 can match the timing of the input current Ip of the inverter 20 and the timing of the output current Io of the DC/DC converter 41, thereby being able to greatly reduce the effective value of the current Icap flowing through the DC link capacitor 30.

Up to this point, the case in which the DC/DC converter 41 has the on-duty D greater than 0.5 (0.6) has been described. Next, a method of matching the phase of the input current Ip to the inverter 20 and the phase of the output current Io of the 2-phase DC/DC converter 41 will be described in the case where the on-duty D is less than 0.5.

Figure 22:
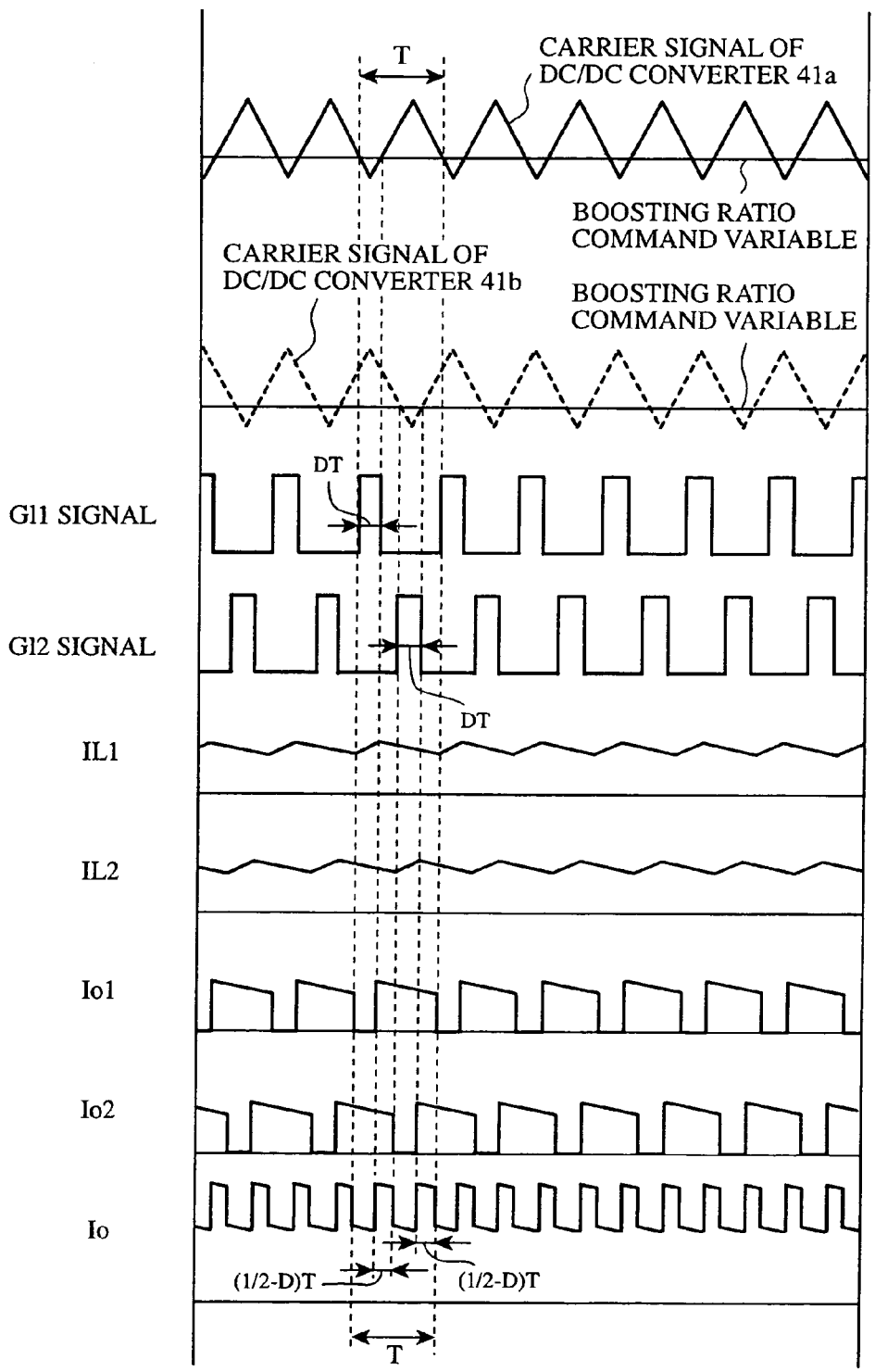
FIG. 22 is a diagram illustrating the operation of a DC/DC converter with an on-duty D of 0.33.

FIG. 22 is a diagram illustrating the operation of the DC/DC converter 41 when the on-duty D is 0.33. As shown in FIG. 22, when the on-duty D is less than 0.5, there are some overlap in their time between the output current Io1 of the DC/DC converter 41a and the output current Io2 of the DC/DC converter 41b. Accordingly, the output current Io of the DC/DC converter 41 has such a waveform as a pulse current is superimposed on a DC current component. The superimposed pulse current is output twice during the carrier signal period T of the DC/DC converter 41, and its pulse width is (½−D)×T. Thus, although the DC current component is superimposed when the on-duty D is less than 0.5, the fundamental frequency of the output current Io of the DC/DC converter 41 can be made twice the carrier signal frequency of the DC/DC converter.

The period in which the output current Io of the DC/DC converter 41 becomes minimum is the time in which one of the lower side switches SL1 and SL2 of the DC/DC converters 41a and 41b is in the ON state. Accordingly, the phase of the input current Ip to the inverter 20 and the phase of the output current Io of the DC/DC converter 41 can be matched by matching the timing at which the inverter 20 enters the voltage zero vector mode and the timing at which one of the lower side switches SL1 and SL2 of the DC/DC converters 41a and 41b turns on.

Figure 23:
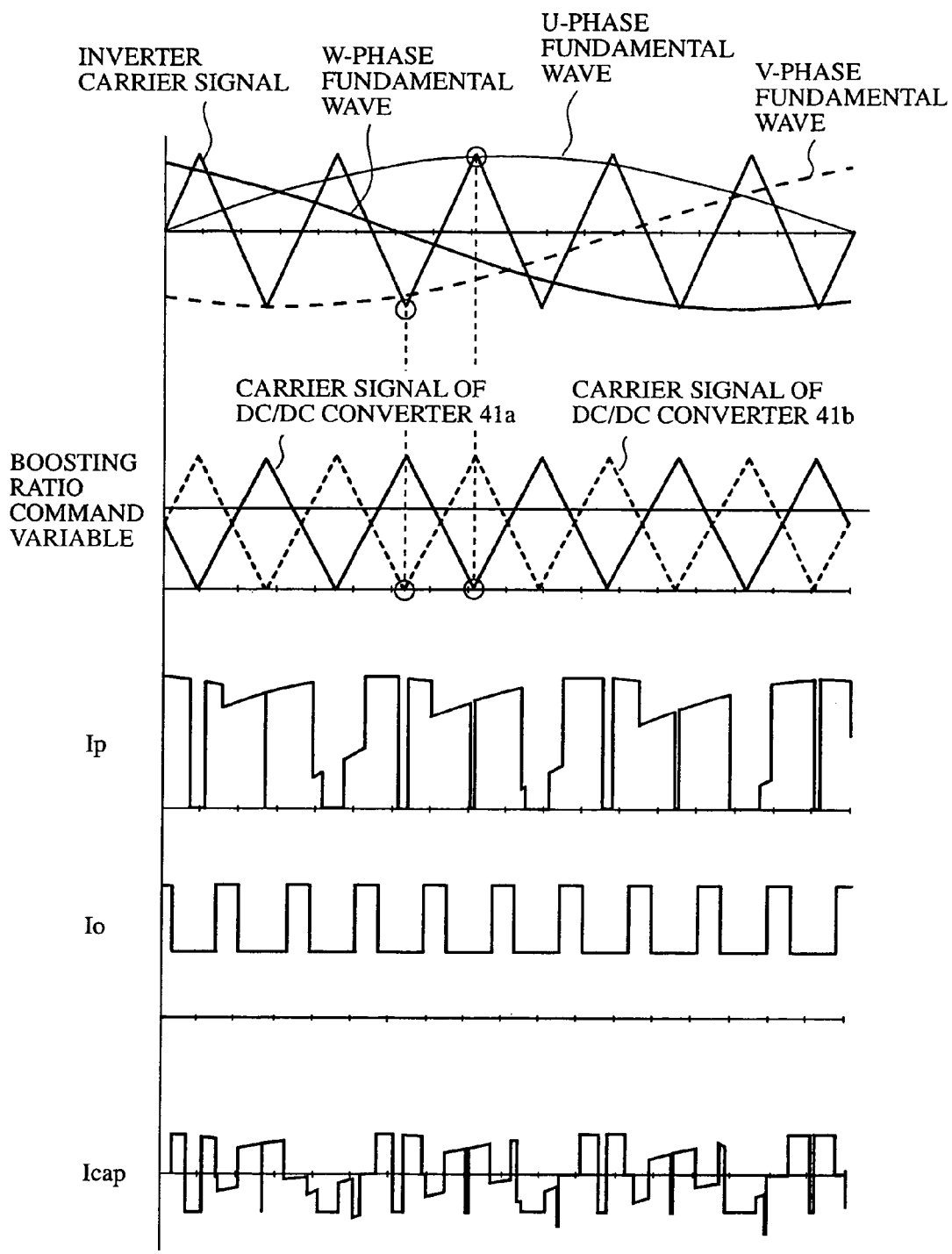
FIG. 23 is a diagram illustrating operation waveforms when the carrier signals of the inverter and DC/DC converter are optimized in the embodiment 2 in accordance with the present invention.

FIG. 23 is a diagram illustrating operation waveforms when the phase of the triangular wave comparing type PWM inverter 20 and the phase of the DC/DC converter 41 with the on-duty D of 0.33 are optimized by applying the foregoing method. As shown in FIG. 23, the timing at which the carrier signal of the inverter 20 comes to peaks and the timing at which the carrier signal of the DC/DC converter 41a comes to the valleys are approximately matched, and the timing at which the carrier signal of the inverter 20 comes to valleys and the timing at which the carrier signal of the DC/DC converter 41b comes to the valleys are approximately matched. Here, the inverter 20 has the driving conditions that the modulation factor is 1.0 and the power factor is 0.9, and the DC/DC converter 41 has the boosting ratio command variable of 1.5.

Thus, even when the on-duty D of the DC/DC converter 41 is 0.33, the timing of the input current Ip of the inverter 20 and the timing of the output current Io of the DC/DC converter 41 can be matched, which enables the effective value of the current Icap flowing through the DC link capacitor 30 to be reduced markedly.

Next, the relationships between the on-duty and the boosting ratio command variable of the DC/DC converter 41 will be described. The operation of the DC/DC converter 41 has two modes: a current continuous mode in which currents flow uninterruptedly through the choke coils L1 and L2; and a current discontinuous mode in which the currents flowing through L1 and L2 have a period in which the current value becomes zero. Usually, the DC/DC converter 41 operates in the current continuous mode except for the time when the load is extremely light.

When the DC/DC converter 41 carries out the boosting operation in the current continuous mode, the following expression (2) holds between the boosting ratio command variable n and the on-duty DL of the lower side switches SL1 and SL2.

$$DL \approx 1 - 1/n \qquad (2)$$

The above expression (2) shows that in the boosting operation the on-duty D is greater than 0.5 when the boosting ratio command variable n is greater than 2.0, and the on-duty D is less than 0.5 when the boosting ratio command variable n is less than 2.0.

On the other hand, when the DC/DC converter 41 carries out the voltage reduction operation in the current continuous mode, the following expression (3) holds between the boosting ratio command variable n and the on-duty DH of the higher side switches SH1 and SH2.

$$DH \approx 1/n \qquad (3)$$

The above expression (3) shows that in the voltage reduction operation also the on-duty D is greater than 0.5 when the boosting ratio command variable n is greater than 2.0, and the on-duty D is less than 0.5 when the boosting ratio command variable n is less than 2.0.

As described above, when the DC/DC converter 41 has the on-duty D greater than 0.5, the present embodiment 2 matches the timing at which the inverter 20 shifts into the voltage zero vector mode and the timing at which both the DC/DC converters 41a and 41b are turned on. In addition, when the DC/DC converter 41 has the on-duty D less than 0.5, the present embodiment 2 matches the timing at which the inverter 20 shifts into the voltage zero vector mode and the timing at which one of the DC/DC converters 41a and 41b is turned on. The phase control carried out in this way can match the phase of the input current Ip to the inverter 20 and the phase of the output current Io of the DC/DC converter 41, thereby being able to reduce the ripple current flowing through the DC link capacitor 30.

Although the boosting operation of the DC/DC converter 41 has been described so far, the fundamental operation of the voltage reduction operation of the DC/DC converter 41 is the same. They differ in that although the lower side switches SL control the DC/DC converter 41 in the boosting operation, the higher side switches SH control the DC/DC converter 41 in the voltage reduction operation.

As described above, the embodiment 2 is configured such that when the phases of the carrier signals of the DC/DC converters 41a and 41b constituting the 2-phase DC/DC converter 41 are shifted by 180 degrees, and when the boosting ratio command variable n of the DC/DC converter 41 is greater than 2.0, the timing at which the inverter 20 enters the voltage zero vector mode and the timing at which both the DC/DC converters 41a and 41b constituting the DC/DC converter 41 are tuned on are matched. In addition, when the boosting ratio command variable n of the DC/DC converter 41 is less than 2.0, the timing at which the inverter 20 enters the voltage zero vector mode and the timing at which one of the DC/DC converters 41a and 41b is turned on are matched. This makes it possible to match the phase of the input current Ip to the inverter 20 and the phase of the output current Io of the DC/DC converter 41, thereby being able to reduce the ripple current flowing through the DC link capacitor 30.

Incidentally, although the embodiment 2 employs the triangular wave comparing PWM inverter as the inverter 20, applying the optimization method of the embodiment 2 enables a sawtooth wave comparing PWM inverter or a space voltage vector PWM inverter to reduce the ripple current flowing through the DC link capacitor 30.

Embodiment 3

The configuration of the motor driving apparatus of the embodiment 3 is the same as that of the embodiment 2 as shown in FIG. 18. In the embodiment 2, the phases of the carrier signals of the DC/DC converters 41a and 41b are shifted by 180 degrees so that fundamental frequency of the output current Io of the DC/DC converter 41 becomes twice the carrier signal frequency of the DC/DC converter 41. In contrast, the embodiment 3 controls the DC/DC converter 41 in such a manner that the fundamental frequency of the output current Io of the DC/DC converter 41 is equal to the carrier signal frequency of the DC/DC converter 41.

Figure 24:
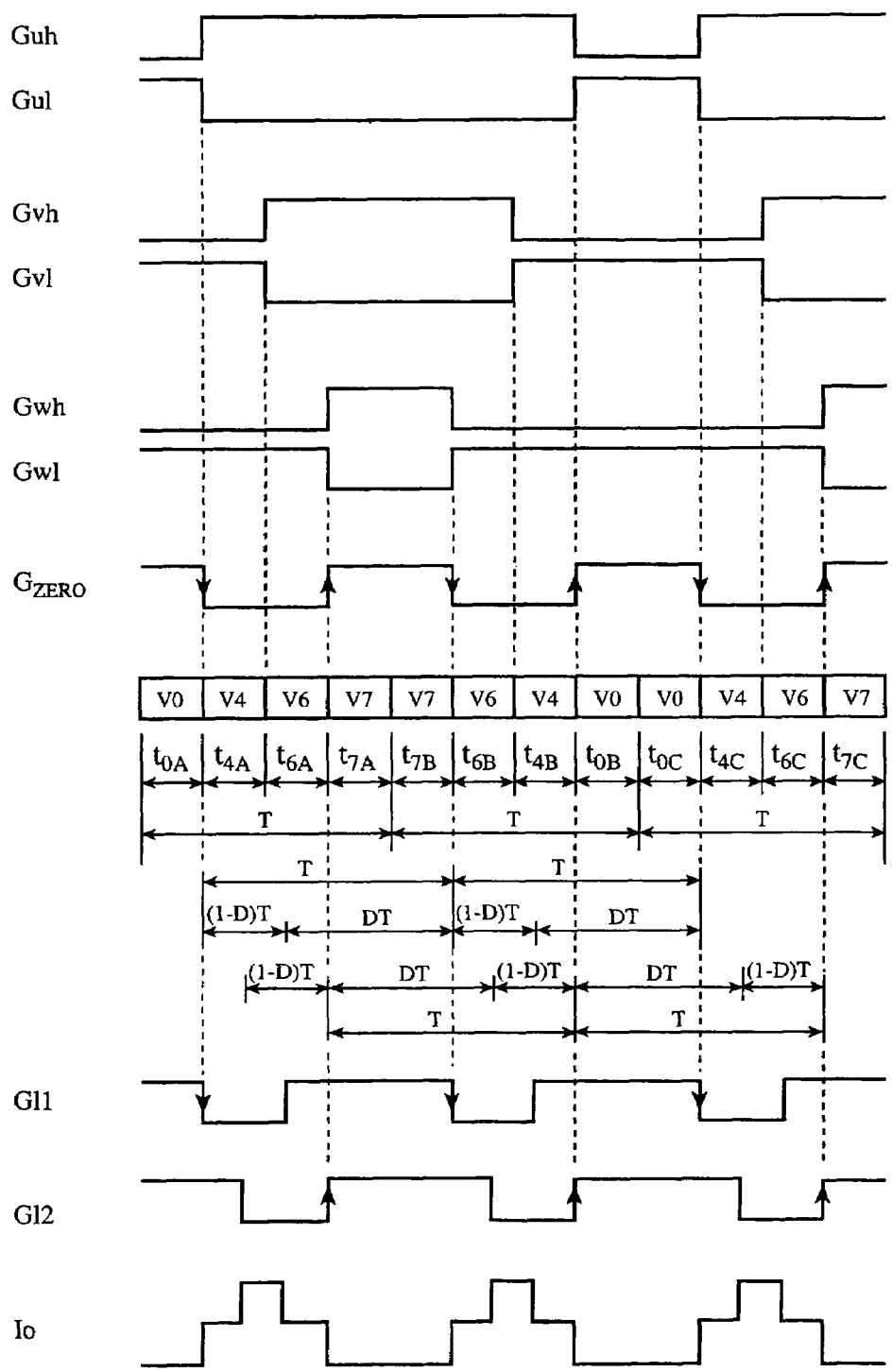
FIG. 24 is a diagram illustrating the boosting operation of the 2-phase DC/DC converter of an embodiment 3 in accordance with the present invention.

FIG. 24 is a diagram illustrating the boosting operation of the DC/DC converter 41 of the embodiment 3. The reference symbol $G_{ZERO}$ designates a voltage zero vector signal, which is placed at a high level when the inverter 20 is in the voltage zero vector mode, and at a low level at the remaining time periods. The reference symbol G11 designates an ON signal of the lower side switch SL1 of the DC/DC converter 41a, and G12 designates an ON signal of the lower side switch SL2 of the DC/DC converter 41b.

As shown in FIG. 24, the embodiment 3 shifts G11 from the high level to the low level when the voltage zero vector signal $G_{ZERO}$ shifts from the high level to the low level, and shifts G12 from the low level to the high level when the voltage zero vector signal $G_{ZERO}$ shifts from the low level to the high level. When the on-duty of the DC/DC converters 41a and 41b is D, the duration in which G11 keeps the high level (the duration in which the lower side switch SL1 is in the ON state) is given by D×T, and the duration in which G12 keeps the low level (the duration in which the lower side switch SL2 is in the OFF state) is given by (1−D)×T.

Figure 25:
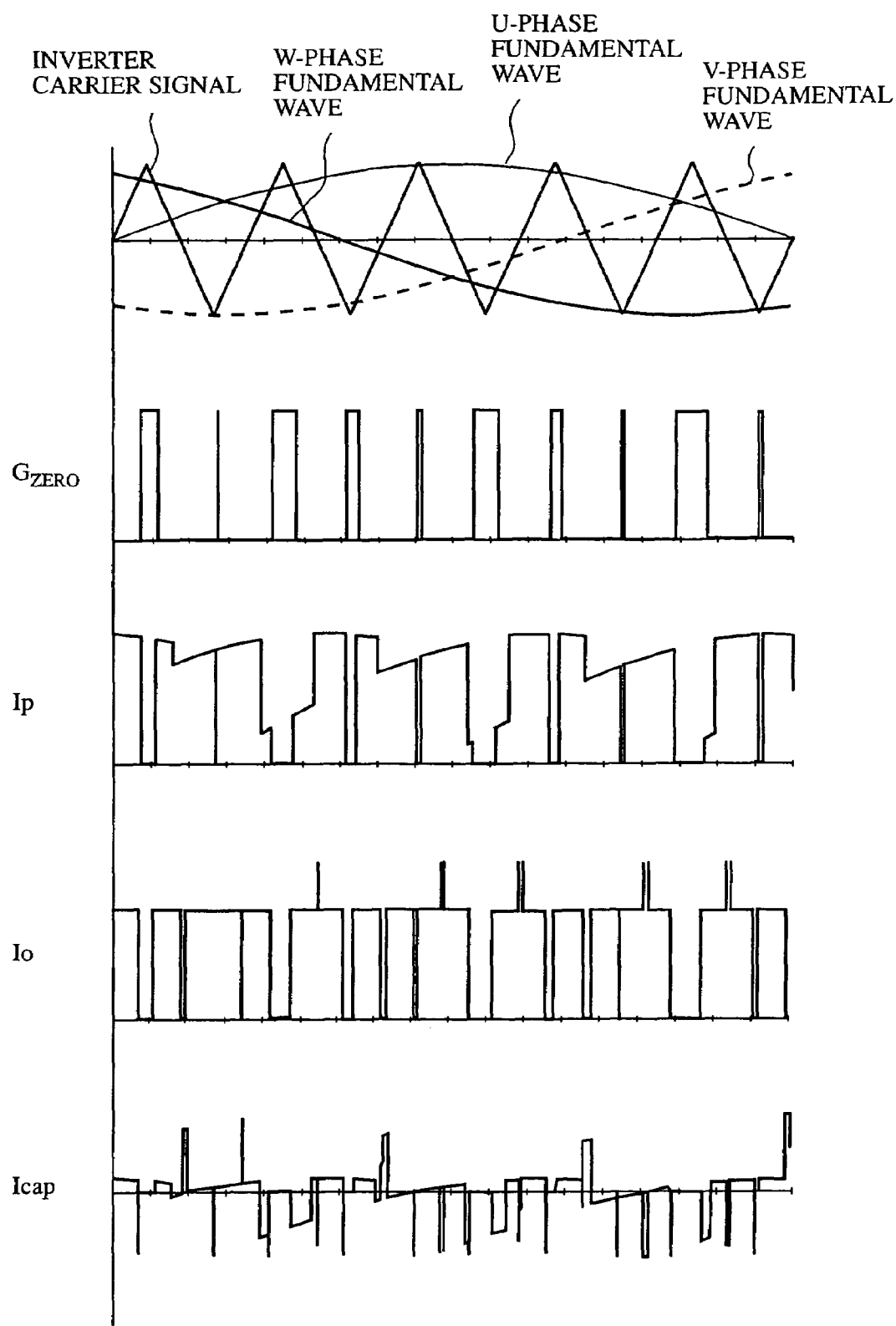
FIG. 25 is a diagram illustrating operation waveforms when the carrier signals of the inverter and DC/DC converter are optimized in the embodiment 3 in accordance with the present invention.

FIG. 25 is a diagram illustrating operation waveforms when the timing of the inverter 20 and the timing of the DC/DC converter 41 are optimized. Here, the inverter 20 has the driving conditions that the modulation factor is 1.0 and the power factor is 0.9, and the DC/DC converter 41 has the boosting ratio command variable of 2.5. The optimization by the embodiment 3 makes it possible to match the timing of the input current Ip of the inverter 20 and the timing of the output current Io of the DC/DC converter 41 more accurately, thereby being able to further reduce the ripple current of the DC link capacitor 30.

In the voltage reduction operation of the DC/DC converter 41, the current of the DC link capacitor 30 can be reduced as in the boosting operation.

As described above, the present embodiment 3, when controlling the DC/DC converter 41 in such a manner that the fundamental frequency of the output current Io of the DC/DC converter 41 agrees with the carrier signal frequency of the DC/DC converter 41, can minimize the current Icap flowing through the DC link capacitor 30 by approximately matching the timing at which the inverter 20 enters the voltage zero vector mode and the ON timing of one of the DC/DC converters constituting the 2-phase DC/DC converter 41, and by approximately matching the timing at which the inverter 20 exits the voltage zero vector mode and the OFF timing of the other of the DC/DC converters constituting the DC/DC converter 41, thereby being able to further downsize the DC link capacitor.

Embodiment 4

The configuration of the motor driving apparatus of the embodiment 4 is the same as that of the embodiment 2 as shown in FIG. 18. The embodiment 4 further reduces the ripple current of the DC link capacitor 30 by optimizing the output voltage VPN of the DC/DC converter 41 and the modulation factor of the inverter 20.

The AC output voltage $V_{INV}$ of the inverter 20 is directly proportional to the product of the output voltage $V_{PN}$ of the DC/DC converter 41 and the modulation factor m of the inverter 20. Besides, the output voltage $V_{PN}$ of the DC/DC converter 41 is the product of the voltage $V_{IN}$ of the high voltage battery 50 and the boosting ratio command variable n of the DC/DC converter 41. Thus, the AC output voltage $V_{INV}$ of the inverter 20 is given by the following expression (4).

$$V_{INV} = V_{IN} \times n \times m \times k \tag{4}$$

where k is a constant determined by the control method of the inverter 20. From expression (4), it is seen that there are innumerable choices of the boosting ratio command variable n and the modulation factor m for obtaining the same AC output voltage $V_{INV}$ of the inverter 20.

Figure 26:
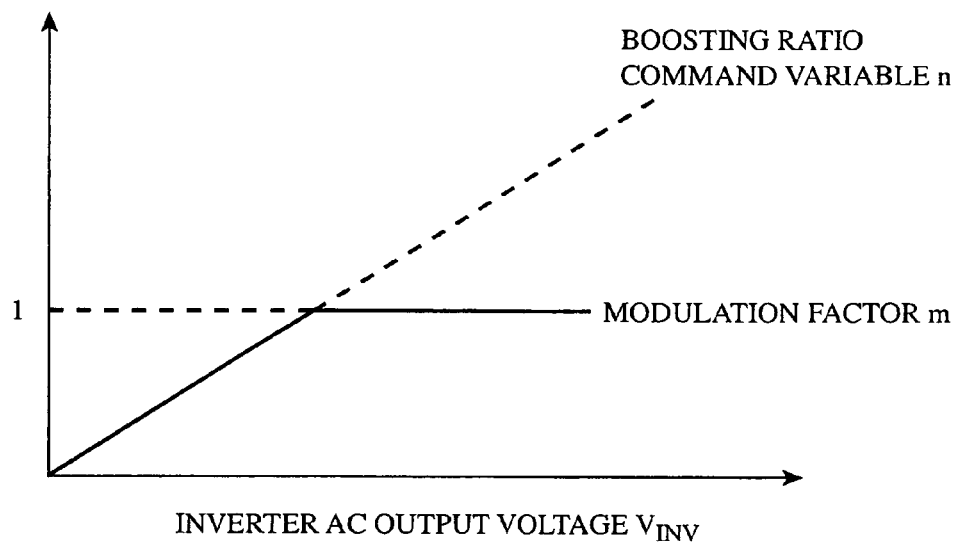
FIG. 26 is a graph illustrating general relationships between the AC output voltage and modulation factor of the inverter and the boosting ratio command variable of the DC/DC converter.

To suppress the switching loss of the inverter 20 and that of the DC/DC converter 41, the output voltage $V_{PN}$ of the DC/DC converter 41 is usually set at the minimum voltage required. FIG. 26 is a diagram illustrating general relationships between the AC output voltage $V_{INV}$ and modulation factor m of the inverter 20 and the boosting ratio command variable n of the DC/DC converter 41. As shown in FIG. 26, the modulation factor m of the inverter 20 is always unity when the DC/DC converter 41 carries out the boosting operation, and the boosting ratio command variable n of the DC/DC converter 41 is always unity when the modulation factor of the inverter 20 is less than one, in which case the DC/DC converter 41 enters the state in which it does not carry out the switching operation.

Figure 27:
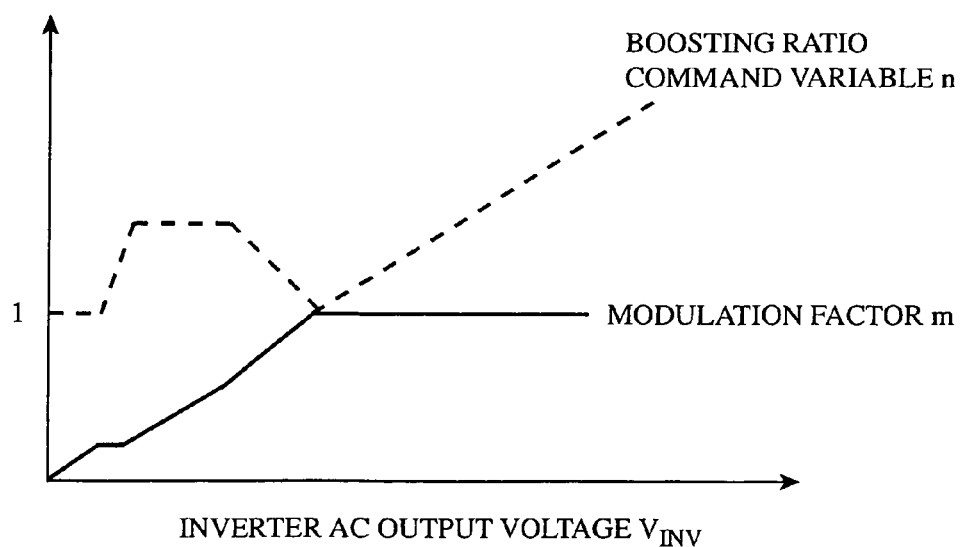
FIG. 27 is a graph illustrating relationships between the AC output voltage and modulation factor of the inverter and the boosting ratio command variable of the DC/DC converter for reducing the effective value of the ripple current of the DC link capacitor.

The embodiment 4 can reduce the effective value of the ripple current of the DC link capacitor 30 by optimizing the boosting ratio command variable n of the DC/DC converter 41 and the modulation factor m of the inverter 20, and by matching the timing of the output current Io of the DC/DC converter 41 and the timing of the input current Ip of the inverter 20. FIG. 27 is a diagram illustrating relationships between the AC output voltage $V_{INV}$ and modulation factor m of the inverter 20 and the boosting ratio command variable n of the DC/DC converter 41 for reducing the effective value of the ripple current of the DC link capacitor 30. FIG. 27 differs from FIG. 26 in that an area in which the boosting ratio command variable n is made greater than one and the modulation factor m is lowered is provided in the region where the AC output voltage $V_{INV}$ of the inverter 20 is low.

Figure 28:
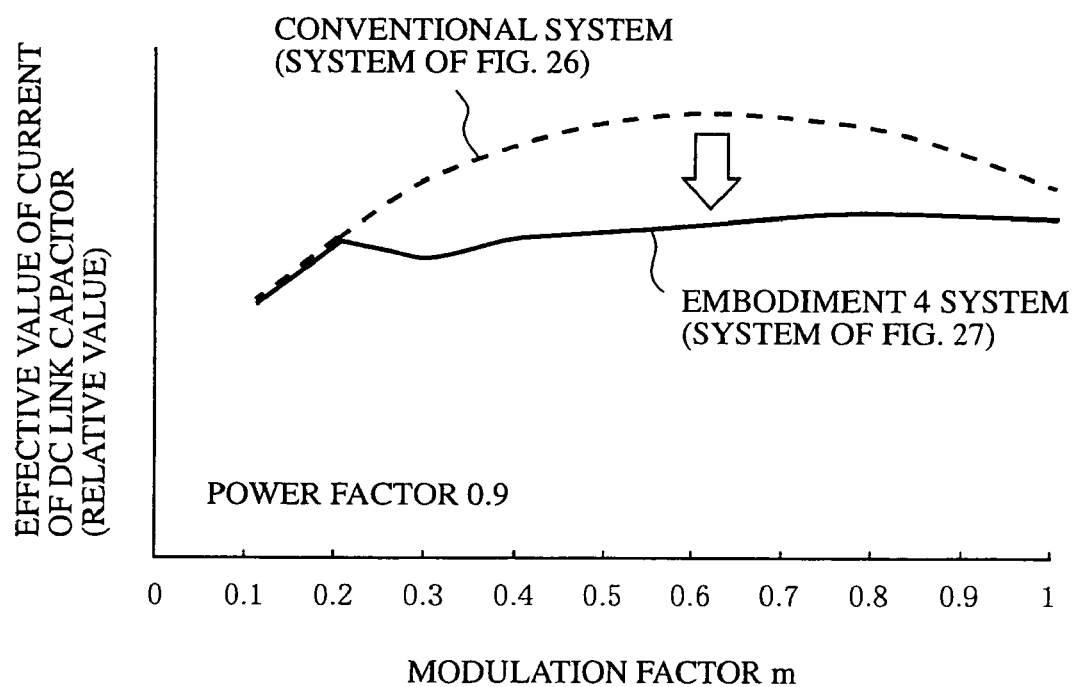
FIG. 28 is a graph illustrating the effective value of the ripple current of the DC link capacitor when switching control is not carried out, and the effective value of the ripple current of the DC link capacitor when the switching control of an embodiment 4 in accordance with the present invention is carried out.

FIG. 28 is a graph illustrating the effective value of the ripple current of the DC link capacitor 30 when the boosting ratio command variable of the DC/DC converter 41 is one and no switching operation is carried out, and the effective value of the ripple current of the DC link capacitor 30 when the embodiment 4 is applied (both are relative values). Here, the power factor of the inverter 20 is made 0.9. As is clear from FIG. 28, the embodiment 4 enables the reduction in the effective value of the ripple current of the DC link capacitor 30. The reduction effect of the ripple current of the DC link capacitor 30 according to the embodiment 4 is about 25%.

As described above, the embodiment 4 can reduce the effective value of the ripple current of the DC link capacitor 30 by optimizing the boosting ratio command variable n of the DC/DC converter 41 and the modulation factor m of the inverter 20, and by matching the timing of the output current Io of the DC/DC converter 41 and the timing of the input current Ip of the inverter 20, thereby being able to downsize the DC link capacitor 30.

Embodiment 5

Figure 29:
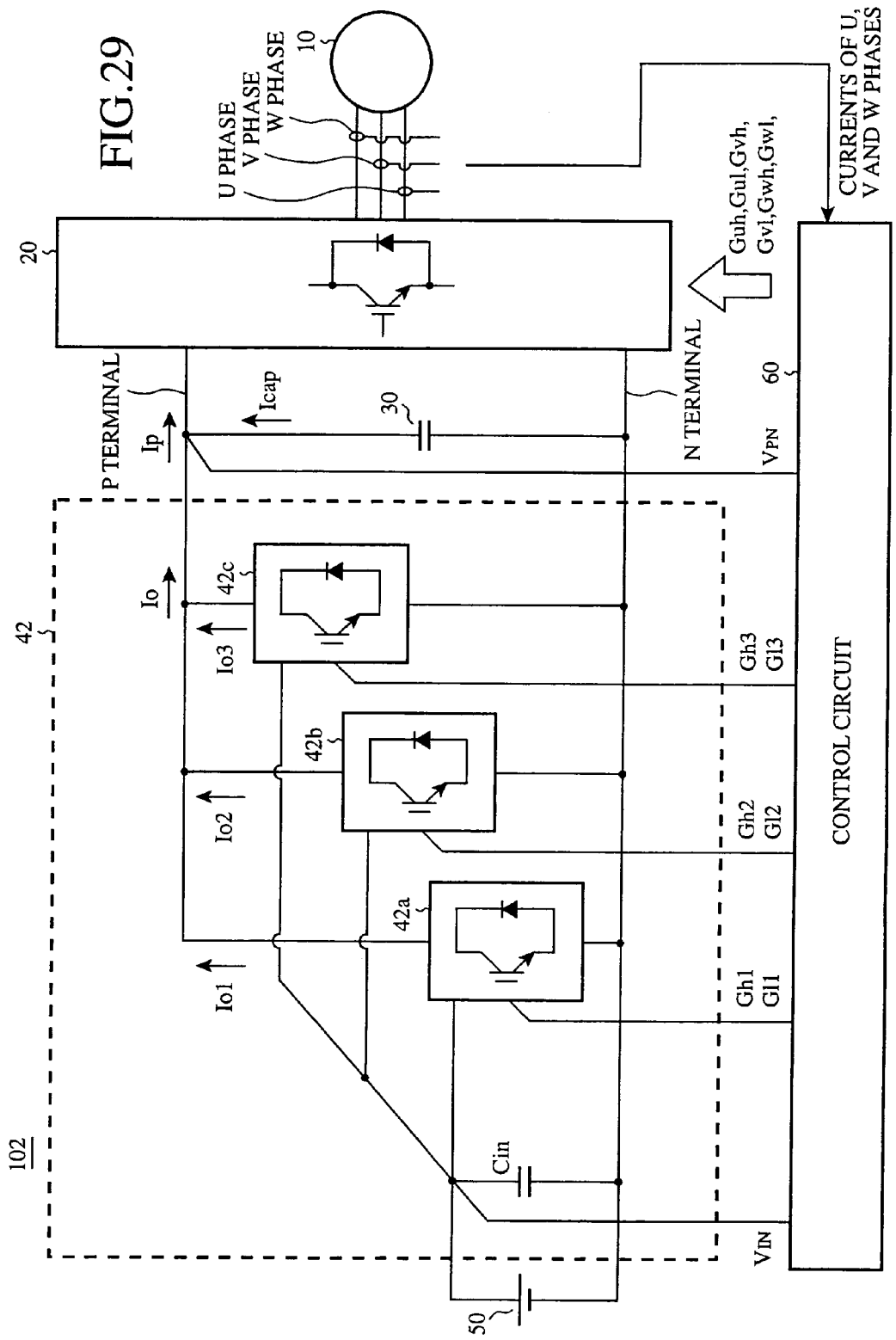
FIG. 29 is a block diagram showing a configuration of a motor driving apparatus of an embodiment 5 in accordance with the present invention.

FIG. 29 is a block diagram showing a configuration of a motor driving apparatus 102 of the embodiment 5 in accordance with the present invention. In FIG. 29, the same reference numerals designate the same components as those of FIGS. 1 and 18. The configuration of FIG. 29 differs from that of FIG. 18 in that a DC/DC converter 42 has a 3-phase system. The DC/DC converter 42 includes a DC/DC converter 42a, a DC/DC converter 42b, and a DC/DC converter 42c. The configuration of the DC/DC converters 42a, 42b and 42c is the same as that of the DC/DC converters 41a and 41b.

Next, the operation of the 3-phase DC/DC converter 42 will be described. The embodiment 5 shifts the phases of the carrier signals of the DC/DC converters 42a, 42b and 42c by 120 degrees each. This is because shifting the carrier phases of the three DC/DC converters 42a, 42b and 42c by 120 degrees can make the fundamental frequency of the output current Io of the DC/DC converter 42 three times higher than the carrier signal frequency of the DC/DC converter 42.

To match the input current Ip of the inverter 20 and the fundamental frequency of the output current Io of the 3-phase DC/DC converter 42 when the inverter 20 is based on the triangular wave comparing type PWM control, the carrier signal frequency of the DC/DC converter 42 should to be placed at ⅔ of the carrier signal frequency of the inverter 20.

Next, a method of matching the phase of the input current Ip to the inverter 20 and the phase of the output current Io of the 3-phase DC/DC converter 42 will be described.

Figure 30:
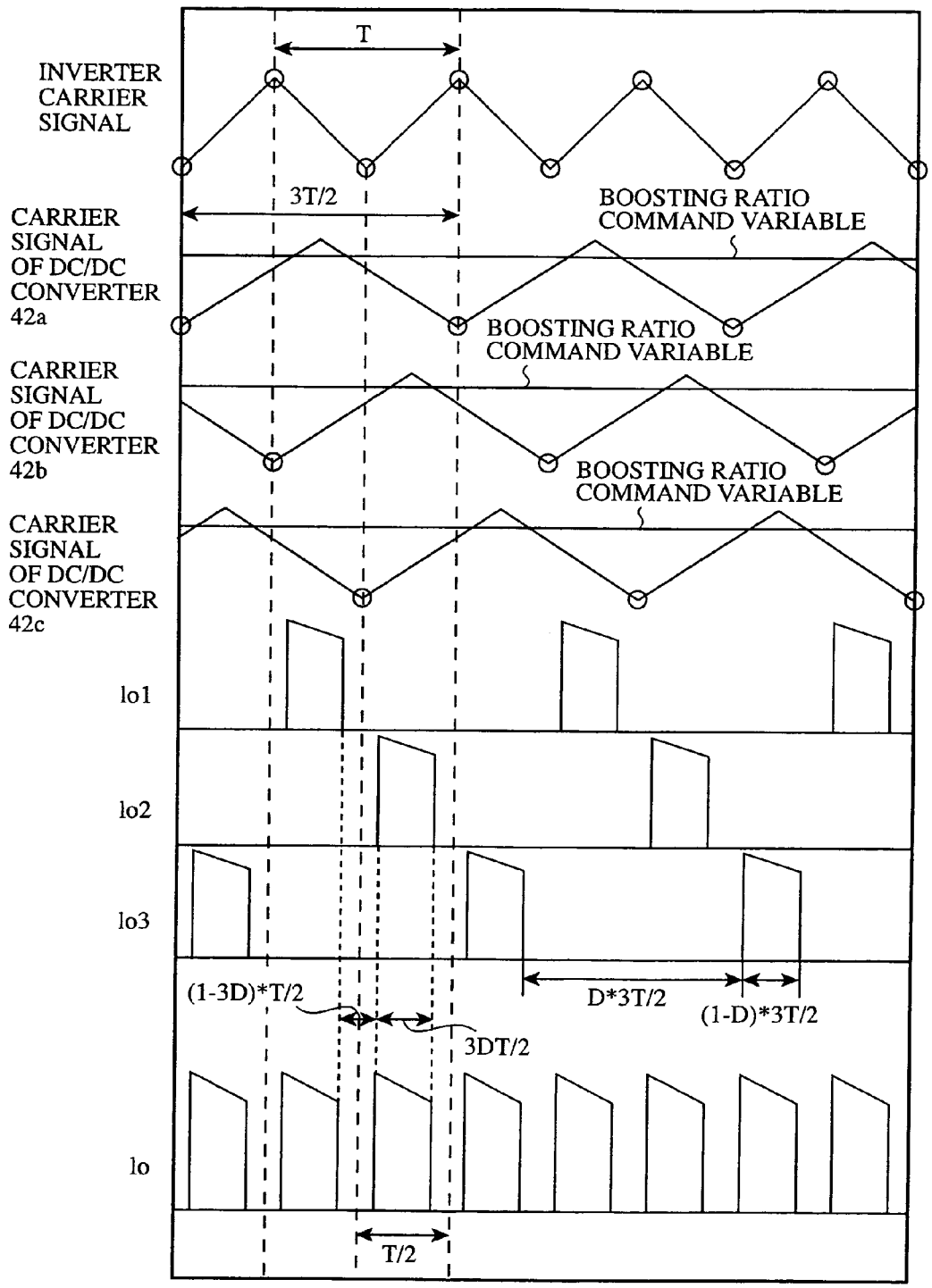
FIG. 30 is a diagram illustrating the operation of the DC/DC converter when the on-duty D is 0.8.

FIG. 30 is a diagram illustrating the operation of the DC/DC converter 42 when the on-duty D is 0.8. When the on-duty D is equal to or greater than 0.667, there are periods in which the output current Io of the DC/DC converter 42 is zero. The periods take place when the lower side switches SL1, SL2 and SL3 of the three DC/DC converters 42a, 42b and 42c are all in the ON state. Accordingly, the phase of the input current Ip to the inverter 20 and the phase of the output current Io of the DC/DC converter 42 can be matched by matching the timing in which the inverter 20 is in the voltage zero vector mode and the timing in which the DC/DC converters 42a, 42b and 42c are all in the ON state. When the inverter 20 undergoes a triangular wave comparing type PWM control, the phase of the input current Ip of the inverter 20 and the phase of the output current Io of the DC/DC converter 42 can be matched by matching the timing at which the carrier signal of the inverter 20 comes to peaks or valleys and the timing at which the carrier signal of one of the DC/DC converters 42a, 42b and 42c comes to the valleys.

Figure 31:
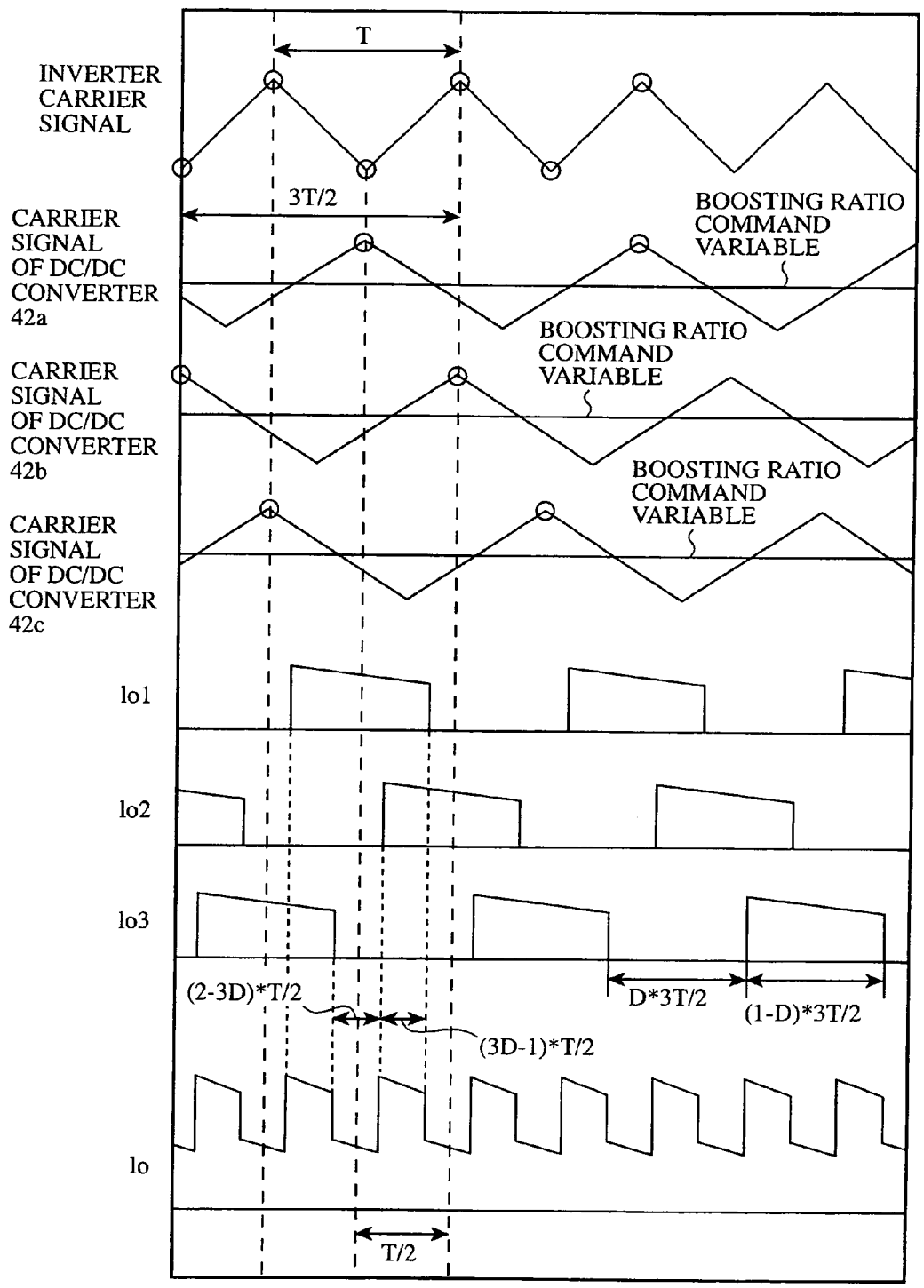
FIG. 31 is a diagram illustrating the operation of the DC/DC converter when the on-duty D is 0.5.

FIG. 31 is a diagram illustrating the operation of the DC/DC converter 42 when the on-duty D is 0.5. When the on-duty D is equal to or greater than 0.333 and less than 0.667, the output currents of two DC/DC converters of the three DC/DC converters 42a, 42b and 42c overlap each other in time so that the output current Io of the DC/DC converter 42 has such a waveform as a pulse current is superimposed on a DC current component. The output current Io of the DC/DC converter 42 becomes minimum in periods when two DC/DC converters of the three DC/DC converters are in the ON state. Therefore the phase of the input current Ip of the inverter 20 and the phase of the output current Io of the DC/DC converter 42 can be matched by matching the timing in which the inverter 20 is in the voltage zero vector mode and the timing in which the two DC/DC converters of the three DC/DC converters are in the ON state. When the inverter 20 undergoes the triangular wave comparing type PWM control, the phase of the input current Ip of the inverter 20 and the phase of the output current Io of the DC/DC converter 42 can be matched by matching the timing at which the carrier signal of the inverter 20 comes to peaks or valleys and the timing at which the carrier signal of one of the DC/DC converters 42a, 42b and 42c comes to peaks.

Figure 32:
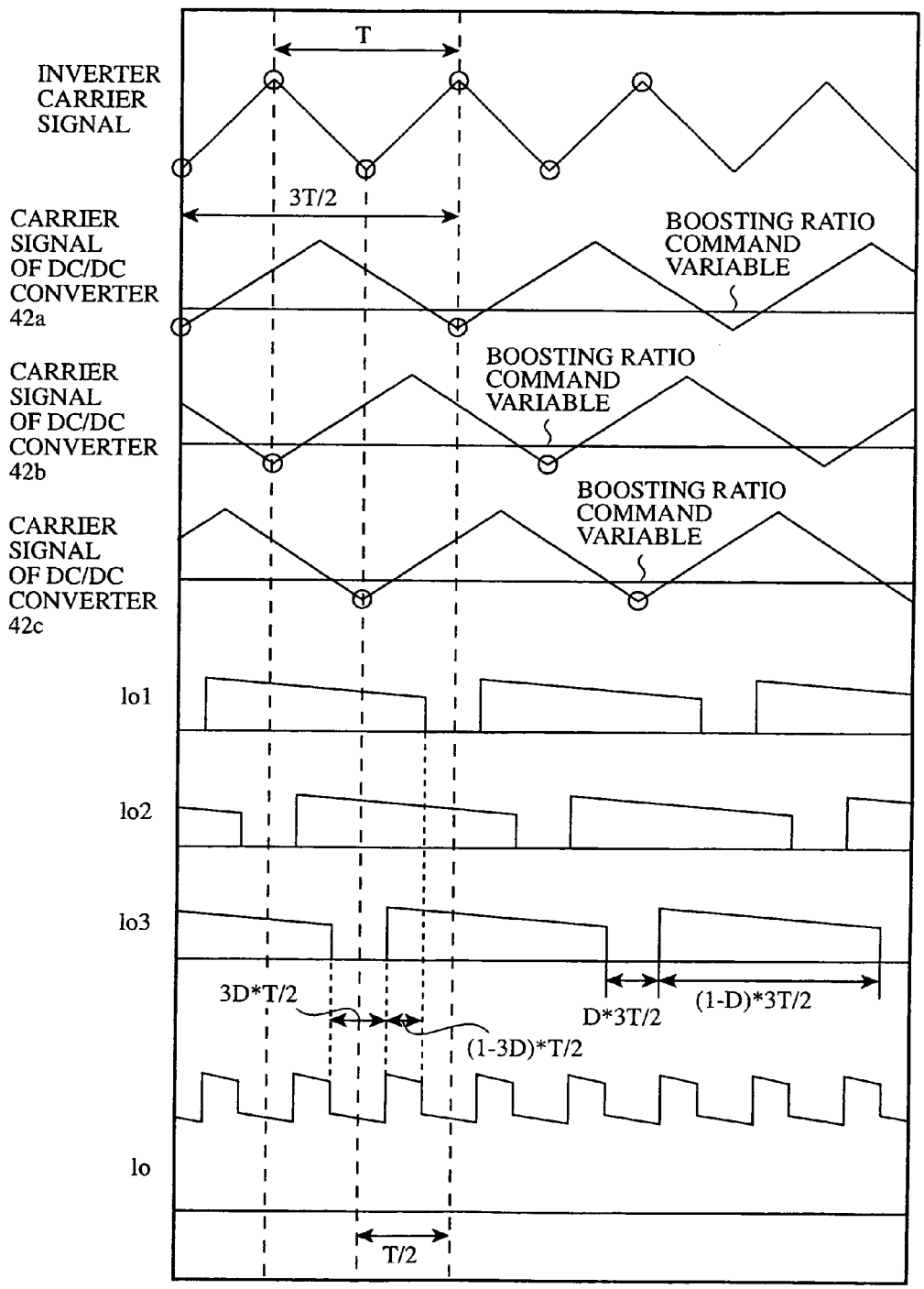
FIG. 32 is a diagram illustrating the operation of the DC/DC converter when the on-duty D is 0.2.

FIG. 32 is a diagram illustrating the operation of the DC/DC converter 42 when the on-duty D is 0.2. When the on-duty D is less than 0.333, the output currents of the three DC/DC converters 42a, 42b and 42c overlap each other in time so that the output current Io of the DC/DC converter 42 has such a waveform as a pulse current is superimposed on a DC current component. The output current Io of the DC/DC converter 42 becomes minimum in periods when one of the DC/DC converters is in the ON state. Therefore the phase of the input current Ip of the inverter 20 and the phase of the output current Io of the DC/DC converter 42 can be matched by matching the timing in which the inverter 20 is in the voltage zero vector mode and the timing in which one of the DC/DC converters is in the ON state. When the inverter 20 undergoes the triangular wave comparing type PWM control, the phase of the input current Ip of the inverter 20 and the phase of the output current Io of the DC/DC converter 42 can be matched by matching the timing at which the carrier signal of the inverter 20 comes to peaks or valleys and the timing at which the carrier signal of one of the DC/DC converters 42a, 42b and 42c comes to the valleys.

Here, it is seen from expression (2) that the on-duty D becomes 0.667 when the boosting ratio command variable is about 3.0, and that the on-duty D becomes 0.333 when the boosting ratio command variable is about 1.5. Accordingly, the optimum phases of the inverter 20 and DC/DC converter 42 for minimizing the ripple current of the DC link capacitor 30 change at threshold values corresponding to the boosting ratio command variables of 3.0 and 1.5.

As described above, the embodiment 5 can match the phase of the input current Ip of the inverter 20 and the phase of the output current Io of the DC/DC converter 42 by matching, when the boosting ratio command variable n of the 3-phase DC/DC converter 42 is greater than 3.0, the timing in which the inverter 20 is in the voltage zero vector mode and the timing in which all the three DC/DC converters 42a, 42b and 42c are in the ON state, and by matching, when the boosting ratio command variable of the DC/DC converter 42 is less than 3.0, the timing in which the inverter 20 is in the voltage zero vector mode and the timing in which one or two of the three DC/DC converters 42a, 42b and 42c are in the ON state. Thus, the present embodiment 5 can reduce the ripple current flowing through the DC link capacitor 30.

Incidentally, although the embodiment 5 is described by way of example of the triangular wave comparing PWM inverter, the present method is applicable to a sawtooth wave comparing PWM inverter and a space voltage vector PWM inverter, which makes it possible to reduce the ripple current flowing through the DC link capacitor 30.

In addition, as for a 4-phase DC/DC converter, it can achieve similar results when the boosting ratio command variable n is equal to or greater than 4.0, and when it is less than 4.0.

Embodiment 6

Figure 33:
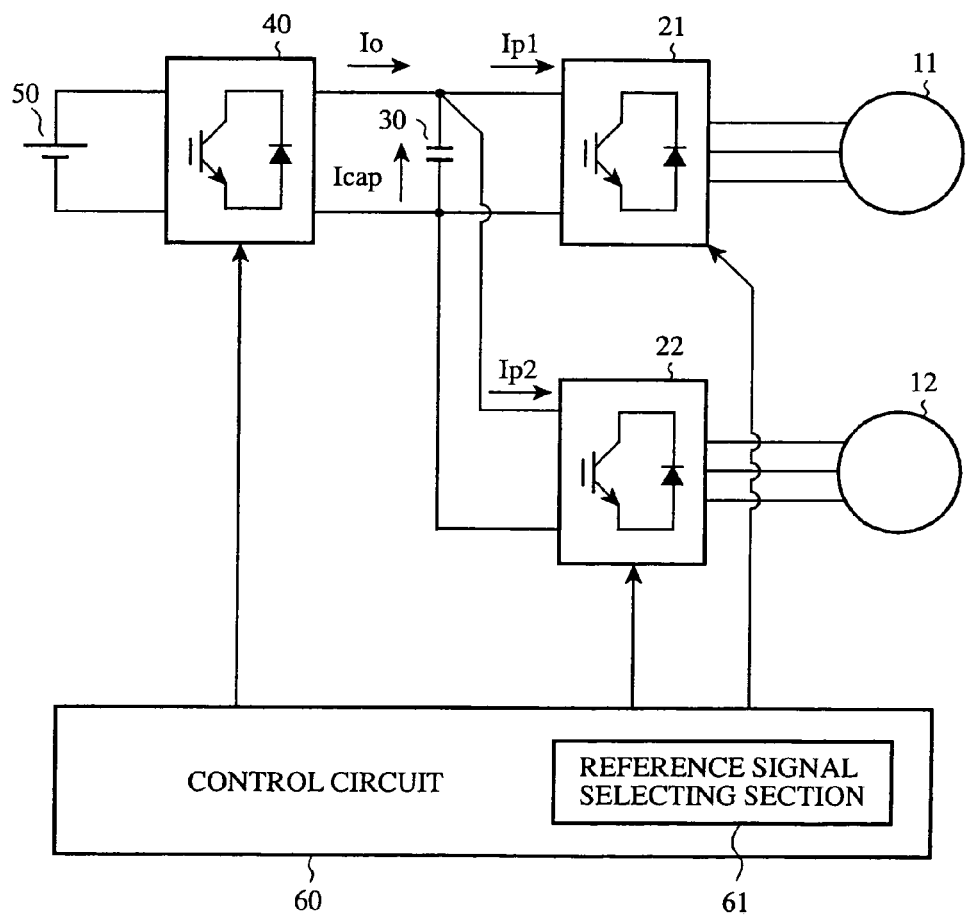
FIG. 33 is a block diagram showing a configuration of a motor driving apparatus of an embodiment 6 in accordance with the present invention.

FIG. 33 is a block diagram showing a configuration of a motor driving apparatus 103 of the embodiment 6 in accordance with the present invention. In FIG. 33, the same reference numerals designate the same components as those of FIG. 1. The configuration as shown in FIG. 33 differs from that of FIG. 1 in that it includes a plurality of (two in this case) inverters 21 and 22 having the DC link capacitor 30 as a common DC input. The inverter 21 controls a vehicle driving motor 11, and the inverter 22 controls a vehicle driving motor 12.

As for the vehicle driving motors 11 and 12, it is possible to independently control the operation as motors for supplying driving force during traveling of the vehicle, and the operation as generators for converting the driving force of an engine or the kinetic energy during deceleration of the vehicle into electrical energy. To achieve this, the following operations are possible for the motor driving apparatus 103 with such a configuration: operating one of the motors as a generator, and using the generated power by the other motor; operating the two motors by using the power of the battery; and charging the battery by operating the two motors as generators.

In the motor driving apparatus 103 with such a configuration, the ripple current Icap flowing through the DC link capacitor 30 is the difference between the sum total of the input current Ip1 of the inverter 21 and the input current Ip2 of the inverter 22, and the output current Io of the DC/DC converter 40. Accordingly, the ripple current of the DC link capacitor 30 Icap can be reduced by matching the total input current to the inverter given by the sum total of Ip1 and Ip2, and the output current Io of the DC/DC converter 40.

In the embodiment 6, the control circuit 60 has a reference signal selecting section for selecting one of the carrier signals of the inverters 21 and 22 as a reference signal for deciding the switching timing of the DC/DC converter 40. Then, according to the reference signal selected, the embodiment 6 decides the switching timing of the DC/DC converter 40.

Using the control power quantity or AC current quantity of the inverter 21 (vehicle driving motor 11) and that of the inverter 22 (vehicle driving motor 12) as a decision reference, the reference signal selecting section selects the carrier signal of the inverter with a greater control power quantity or AC current quantity as the reference signal. According to a method similar to the methods of the embodiments 1-5, the optimum phase control section determines the switching timing of the DC/DC converter 40 for minimizing the current Icap of the DC link capacitor 30 on the basis of the carrier signal of the inverter decided by the reference signal selecting section 61. Carrying out the control in this way, the present embodiment 6 can match the timing of the pulse current (one of Ip1 and Ip2) dominating the total input current of the inverters and the timing of the output current Io of the DC/DC converter 40 constituting a pulse current, thereby being able to reduce the ripple current of the DC link capacitor 30 Icap.

Although the embodiment 6 is described by way of example that has two inverters, a configuration having three or more inverters can be handled in the same manner.

As described above, the embodiment 6 is configured such that when it includes a plurality of inverters, it adopts the carrier signal of the inverter with a greater control power quantity or AC current quantity as the reference signal, and determines the switching timing of the DC/DC converter 40 in accordance with the reference signal. Thus, the present embodiment 6 can reduce the effective value of the ripple current of the DC link capacitor 30 even when it includes a plurality of inverters having the DC link capacitor 30 as the common DC input, thereby being able to downsize the DC link capacitor 30.

What is claimed is:

1. A motor driving apparatus comprising:
   a power supply;
   a DC/DC converter connected to said power supply;
   an inverter connected to said DC/DC converter;
   a DC link capacitor connected between said inverter and said DC/DC converter for smoothing a voltage; and
   a control circuit for controlling power supply from said DC/DC converter to said inverter in a manner that a period in which output current of said DC/DC converter becomes zero takes place in a period during which an input current to said inverter is zero,
   wherein said inverter and said DC/DC converter are based on triangular wave comparing type PWM control;
   said DC/DC converter is a 2-phase DC/DC converter having a first DC/DC converter and a second DC/DC converter, a carrier signal of said first DC/DC converter and a carrier signal of said second DC/DC converter having a phase difference of 180 degrees, and a boosting ratio command variable being less than two; and
   said control circuit matches timing of peaks of a carrier signal of said inverter and timing of valleys of the carrier signal of said first DC/DC converter, and timing of valleys of the carrier signal of said inverter and timing of valleys of the carrier signal of said second DC/DC converter.

2. A motor driving apparatus comprising:
   a power supply;
   a DC/DC converter connected to said power supply;
   an inverter connected to said DC/DC converter;
   a DC link capacitor connected between said inverter and said DC/DC converter for smoothing a voltage; and
   a control circuit for controlling power supply from said DC/DC converter to said inverter in a manner that a period in which output current of said DC/DC converter becomes zero takes place in a period during which an input current to said inverter is zero,
   wherein
   said inverter and said DC/DC converter are based on triangular wave comparing type PWM control;
   said DC/DC converter is a 2-phase DC/DC converter having a first DC/DC converter and a second DC/DC converter, a carrier signal of said first DC/DC converter and a carrier signal of said second DC/DC converter having a phase difference of 180 degrees, and a boosting ratio command variable being equal to or greater than two; and
   said control circuit matches timing of peaks and valleys of a carrier signal of said inverter and timing of midpoints between peaks and valleys of the carrier signals of said first DC/DC converter and of said second DC/DC converter.

3. A motor driving apparatus comprising:
   a power supply;
   a DC/DC converter connected to said power supply;
   an inverter connected to said DC/DC converter;
   a DC link capacitor connected between said inverter and said DC/DC converter for smoothing a voltage; and
   a control circuit for controlling power supply from said DC/DC converter to said inverter in a manner that a period in which output pulse current of said DC/DC converter has a minimum amplitude takes place in a period during which an input pulse current to said inverter has a minimum amplitude, wherein said control circuit synchronizes a frequency of an inverter carrier signal for driving said inverter and a frequency of a DC/DC converter carrier signal for driving said DC/DC converter, wherein said DC/DC converter is a 2-phase DC/DC converter having two DC/DC converter units; and said control circuit matches timing at which input current to said inverter becomes zero and timing at which output current of one of said DC/DC converter units becomes zero, and timing at which input current to said inverter becomes nonzero and timing at which output current of the other of said DC/DC converter units becomes nonzero.

4. A motor driving apparatus comprising:

a power supply;

a DC/DC converter connected to said power supply;

an inverter connected to said DC/DC converter;

a DC link capacitor connected between said inverter and said DC/DC converter for smoothing a voltage; and a control circuit for controlling power supply from said DC/DC converter to said inverter in a manner that a period in which output pulse current of said DC/DC converter has a minimum amplitude takes place in a period during which an input pulse current to said inverter has a minimum amplitude, wherein said control circuit synchronizes a frequency of an inverter carrier signal for driving said inverter and a frequency of a DC/DC converter carrier signal for driving said DC/DC converter, wherein, said motor driving apparatus comprises a region in which said DC/DC converter carries out boosting operation and voltage reduction operation in a region in which a modulation factor of said inverter is 0.2-1.0.

5. A motor driving apparatus comprising:

a power supply;

a DC/DC converter connected to said power supply;

an inverter connected to said DC/DC converter;

a DC link capacitor connected between said inverter and said DC/DC converter for smoothing a voltage; and a control circuit for controlling power supply from said DC/DC converter to said inverter in a manner that a period in which output current of said DC/DC converter becomes zero takes place in a period during which an input current to said inverter is zero, wherein said inverter and said DC/DC converter are based on triangular wave comparing type PWM control;

said DC/DC converter is a 3-phase DC/DC converter having a first DC/DC converter, a second DC/DC converter and a third DC/DC converter, a carrier signal of said first DC/DC converter and a carrier signal of said second DC/DC converter having a phase difference of 120 degrees, the carrier signal of said second DC/DC converter and a carrier signal of said third DC/DC converter having a phase difference of 120 degrees, and a boosting ratio command variable being less than 1.5 or equal to greater than 3; and said control circuit matches timing of peaks or valleys of a carrier signal of said inverter and timing of valleys of the carrier signal of one of said first to third DC/DC converters.

6. A motor driving apparatus comprising:

a power supply;

a DC/DC converter connected to said power supply;

an inverter connected to said DC/DC converter;

a DC link capacitor connected between said inverter and said DC/DC converter for smoothing a voltage; and a control circuit for controlling power supply from said DC/DC converter to said inverter in a manner that a period in which output current of said DC/DC converter becomes zero takes place in a period during which an input current to said inverter is zero, wherein said inverter and said DC/DC converter are based on triangular wave comparing type PWM control;

said DC/DC converter is a 3-phase DC/DC converter having a first DC/DC converter, a second DC/DC converter and a third DC/DC converter, a carrier signal of said first DC/DC converter and a carrier signal of said second DC/DC converter having a phase difference of 120 degrees, the carrier signal of said second DC/DC converter and a carrier signal of said third DC/DC converter having a phase difference of 120 degrees, and a boosting ratio command variable being equal to greater than 1.5 and less than 3; and said control circuit matches timing of peaks or valleys of a carrier signal of said inverter and timing of peaks of the carrier signal of one of said first to third DC/DC converters.

7. A motor driving apparatus comprising:

a power supply;

a DC/DC converter connected to said power supply;

an inverter connected to said DC/DC converter;

a DC link capacitor connected between said inverter and said DC/DC converter for smoothing a voltage; and a control circuit for controlling power supply from said DC/DC converter to said inverter in a manner that a period in which output pulse current of said DC/DC converter has a minimum amplitude takes place in a period during which an input pulse current to said inverter has a minimum amplitude, wherein said control circuit synchronizes a frequency of an inverter carrier signal for driving said inverter and a frequency of a DC/DC converter carrier signal for driving said DC/DC converter, wherein, said motor driving apparatus comprises a plurality of inverters, wherein said DC link capacitor are connected between said plurality of inverters and said DC/DC converter, for smoothing the voltage, and wherein said control circuit controls power supply from said DC/DC converter to said inverters in a manner that a period in which output current of said DC/DC converter becomes zero takes place in a period during which an input current to one of said plurality of inverters, which has greatest output power or output current, is zero.

* * * * *